(12) United States Patent
Dutta et al.

(10) Patent No.: US 12,395,949 B2
(45) Date of Patent: Aug. 19, 2025

(54) RESOURCE SHARING BETWEEN SIDELINK DEVICES USING DIFFERENT RADIO ACCESS TECHNOLOGIES

(71) Applicant: QUALCOMM Incorporated, San Diego, CA (US)

(72) Inventors: Sourjya Dutta, San Diego, CA (US); Tien Viet Nguyen, Bridgewater, NJ (US); Kapil Gulati, Belle Mead, NJ (US); Shuanshuan Wu, San Diego, CA (US); Arthur Gubeskys, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 667 days.

(21) Appl. No.: 17/737,302

(22) Filed: May 5, 2022

(65) Prior Publication Data

US 2023/0362846 A1    Nov. 9, 2023

(51) Int. Cl.
*H04W 56/00* (2009.01)
*H04W 4/021* (2018.01)
*H04W 72/02* (2009.01)
*H04W 92/18* (2009.01)

(52) U.S. Cl.
CPC ......... *H04W 56/001* (2013.01); *H04W 4/021* (2013.01); *H04W 72/02* (2013.01); *H04W 92/18* (2013.01)

(58) Field of Classification Search
None
See application file for complete search history.

(56) References Cited

U.S. PATENT DOCUMENTS

| | | | |
|---|---|---|---|
| 2019/0150135 A1* | 5/2019 | Lee | H04W 4/70 370/312 |
| 2021/0167903 A1* | 6/2021 | Venkatachari | H04L 5/001 |
| 2021/0377884 A1* | 12/2021 | Lee | H04W 56/001 |
| 2022/0015047 A1* | 1/2022 | Ryu | H04W 4/40 |
| 2022/0124682 A1* | 4/2022 | Ko | H04W 72/02 |
| 2022/0287083 A1* | 9/2022 | Gomes Baltar | H04W 74/0808 |

OTHER PUBLICATIONS

International Search Report and Written Opinion—PCT/US2023/065737 —ISA/EPO—Jul. 14, 2023.

* cited by examiner

*Primary Examiner* — Steve R Young
(74) *Attorney, Agent, or Firm* — Holland & Hart LLP

(57) ABSTRACT

Methods, systems, and devices for wireless communications are described. A user equipment (UE) may receive an indication of a time offset for synchronization signal resources for synchronization signals associated with a first radio access technology (RAT). The UE may determine the synchronization signal resources and a synchronization periodicity based on the indication and a penetration ratio of UEs associated with the first RAT. The UE may selectively transmit the synchronization signals on the synchronization signal resources and according to the synchronization periodicity. Additionally, or alternatively, the UE may determine that other synchronization signal resources are allocated for a second RAT and may select resources for communications associated with the first RAT based on determining that the other synchronization signal resources are allocated. The UE may perform communications associated with the first RAT based on selecting the resources.

29 Claims, 15 Drawing Sheets

RESOURCE SHARING BETWEEN SIDELINK DEVICES USING DIFFERENT RADIO ACCESS TECHNOLOGIES

FIELD OF TECHNOLOGY

The following relates to wireless communications, including resource sharing between sidelink devices using different radio access technologies (RATs).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Some wireless communications systems may support communications between UEs, which may be referred to as sidelink communications. Additionally, or alternatively, some wireless communications systems may support sidelink communications between UEs that communicate using different radio access technologies (RATs). For example, a wireless communications system may include both one or more 5G NR UEs and one or more LTE UEs. However, in some cases, a set of available resources for a UE using a first RAT may not include communication resources for UEs using a second RAT. Additionally, or alternatively, the set of available resources may not include resources for sidelink synchronization signals.

SUMMARY

The described techniques relate to improved methods, systems, devices, and apparatuses that support resource sharing between sidelink devices (e.g., user equipments (UEs)) using different radio access technologies (RATs). For example, the described techniques provide for a UE to configure a set of available resources that includes one or more resources for sidelink synchronization signals. The one or more resources for sidelink synchronization signals may include one or more resources for a first RAT and one or more resources for a second RAT. In some cases, the UE may configure the set of available resources based on one or more factors or conditions, such as a penetration ratio for the first RAT, which may be a percentage of UEs using the first RAT within a geographic area, and an indication of a time offset for synchronization signal resources. The time offset may indicate a timing location of the synchronization signal resources to the UE using the first RAT. In some other cases, the UE using the first RAT may determine that one or more resources are allocated for synchronization signal resources for one or more UEs using the second RAT. For example, the UE using the first RAT may receive an indication, or may be configured with an indication, of one or more synchronization signal resources for the one or more UEs using the second RAT. In some other cases, the UE using the first RAT may receive a synchronization signal from a UE using the second RAT and may configure one or more resources based on receiving the synchronization signal from the UE using the second RAT. Accordingly, the UE using the first RAT may account for sidelink synchronization signals of the first RAT and the second RAT, and may thereby reduce or eliminate interference, among other advantages.

A method for wireless communications at a UE is described. The method may include receiving, an indication of a time offset for a set of multiple synchronization signal resources for one or more sidelink synchronization signals associated with a first RAT, determining the set of multiple synchronization signal resources and a sidelink synchronization periodicity at the UE based on the indication of the time offset and a percentage of UEs associated with the first RAT within a geographic area, and selectively transmitting the one or more sidelink synchronization signals on at least one of the set of multiple synchronization signal resources and according to the sidelink synchronization periodicity.

An apparatus for wireless communications at a UE is described. The apparatus may include a processor, memory coupled with the processor, and instructions stored in the memory. The instructions may be executable by the processor to cause the apparatus to receive, an indication of a time offset for a set of multiple synchronization signal resources for one or more sidelink synchronization signals associated with a first RAT, determine the set of multiple synchronization signal resources and a sidelink synchronization periodicity at the UE based on the indication of the time offset and a percentage of UEs associated with the first RAT within a geographic area, and selectively transmit the one or more sidelink synchronization signals on at least one of the set of multiple synchronization signal resources and according to the sidelink synchronization periodicity.

Another apparatus for wireless communications at a UE is described. The apparatus may include means for receiving, an indication of a time offset for a set of multiple synchronization signal resources for one or more sidelink synchronization signals associated with a first RAT, means for determining the set of multiple synchronization signal resources and a sidelink synchronization periodicity at the UE based on the indication of the time offset and a percentage of UEs associated with the first RAT within a geographic area, and means for selectively transmitting the one or more sidelink synchronization signals on at least one of the set of multiple synchronization signal resources and according to the sidelink synchronization periodicity.

A non-transitory computer-readable medium storing code for wireless communications at a UE is described. The code may include instructions executable by a processor to receive, an indication of a time offset for a set of multiple synchronization signal resources for one or more sidelink synchronization signals associated with a first RAT, determine the set of multiple synchronization signal resources and a sidelink synchronization periodicity at the UE based on the indication of the time offset and a percentage of UEs associated with the first RAT within a geographic area, and selectively transmit the one or more sidelink synchronization signals on at least one of the set of multiple synchronization signal resources and according to the sidelink synchronization periodicity.

In some examples of the method, apparatuses, and non-transitory computer-readable medium described herein, determining the set of multiple synchronization signal resources may include operations, features, means, or instructions for partitioning, for each sidelink synchronization period of one or more sidelink synchronization periods, a first set of multiple time resources for first communications associated with the first RAT, where one or more sidelink synchronization signal periods may be associated with the sidelink synchronization periodicity, partitioning, for the each sidelink synchronization period of the one or more sidelink synchronization periods, a second set of multiple time resources for second communications associated with a second RAT, and partitioning, for the each sidelink synchronization period of the one or more sidelink synchronization periods, the set of multiple synchronization signal resources for the one or more sidelink synchronization signals, where the one or more sidelink synchronization signal periods include the first set of multiple time resources, the second set of multiple time resources, and the set of multiple synchronization signal resources.

Some examples of the method, apparatuses, and non-transitory computer-readable medium described herein may further include operations, features, means, or instructions for determining a quantity of the one or more sidelink synchronization periods according to an integer multiple, where the first set of multiple time resources, the second set of multiple time resources, and the set of multiple synchronization signal resources may be based on the quantity of the one or more sidelink synchronization periods.

In some examples of the method, apparatuses, and non-transitory computer-readable medium described herein, selectively transmitting the one or more sidelink synchronization signals may include operations, features, means, or instructions for partitioning the set of multiple synchronization signal resources for the one or more sidelink synchronization signals in accordance with the determining and transmitting the one or more sidelink synchronization signals based on the partitioning.

Some examples of the method, apparatuses, and non-transitory computer-readable medium described herein may further include operations, features, means, or instructions for partitioning the set of multiple synchronization signal resources for one or more second sidelink synchronization signals associated with a second RAT in accordance with the determining.

In some examples of the method, apparatuses, and non-transitory computer-readable medium described herein, selectively transmitting the one or more sidelink synchronization signals may include operations, features, means, or instructions for refraining from transmitting the one or more sidelink synchronization signals based on a priority of the one or more second sidelink synchronization signals being greater than a priority of the one or more sidelink synchronization signals.

In some examples of the method, apparatuses, and non-transitory computer-readable medium described herein, selectively transmitting the one or more sidelink synchronization signals may include operations, features, means, or instructions for transmitting the one or more sidelink synchronization signals on the at least one of the set of multiple synchronization signal resources.

Some examples of the method, apparatuses, and non-transitory computer-readable medium described herein may further include operations, features, means, or instructions for repartitioning the set of multiple synchronization signal resources based on shifting a first portion of the set of multiple synchronization signal resources by a time interval, where the at least one of the set of multiple synchronization signal resources include the first portion of the set of multiple synchronization signal resources.

Some examples of the method, apparatuses, and non-transitory computer-readable medium described herein may further include operations, features, means, or instructions for transmitting an indication of the time interval, one or more time resources for which the UE performs the repartitioning, or both in system information.

In some examples of the method, apparatuses, and non-transitory computer-readable medium described herein, determining the sidelink synchronization periodicity may include operations, features, means, or instructions for receiving one or more indications of one or more additional sidelink synchronization periodicities and updating the sidelink synchronization periodicity based on the one or more additional sidelink synchronization periodicities being greater than the sidelink synchronization periodicity, a reference signal receive power associated with the indication being greater than a threshold reference signal receive power, or both.

Some examples of the method, apparatuses, and non-transitory computer-readable medium described herein may further include operations, features, means, or instructions for broadcasting an indication of the sidelink synchronization periodicity based on determining the sidelink synchronization periodicity at the UE.

Some examples of the method, apparatuses, and non-transitory computer-readable medium described herein may further include operations, features, means, or instructions for transmitting, at a first time interval, one or more scheduling assignments for scheduling a set of multiple communication resources for a second RAT, the one or more scheduling assignments reserving the at least one of the set of multiple synchronization signal resources for the one or more sidelink synchronization signals.

In some examples of the method, apparatuses, and non-transitory computer-readable medium described herein, selectively transmitting the one or more sidelink synchronization signals may include operations, features, means, or instructions for transmitting, at a second time interval after the first time interval and in accordance with the sidelink synchronization periodicity, the one or more sidelink synchronization signals based on transmitting the one or more scheduling assignments.

In some examples of the method, apparatuses, and non-transitory computer-readable medium described herein, the first RAT includes fifth generation new radio and the second RAT includes long term evolution.

In some examples of the method, apparatuses, and non-transitory computer-readable medium described herein, selectively transmitting the one or more sidelink synchronization signals may include operations, features, means, or instructions for transmitting, at the first time interval, the one or more sidelink synchronization signals based on transmitting the one or more scheduling assignments.

Some examples of the method, apparatuses, and non-transitory computer-readable medium described herein may further include operations, features, means, or instructions for monitoring for one or more second sidelink synchronization signals, determining, based on the monitoring, that a quantity of the one or more second sidelink synchronization signals received at the UE may be below a threshold, and configuring the set of multiple synchronization signal resources for sidelink shared channel signaling, sidelink feedback channel signaling, or both based on determining that a quantity of received sidelink synchronization signals may be below a threshold quantity.

Some examples of the method, apparatuses, and non-transitory computer-readable medium described herein may further include operations, features, means, or instructions for configuring the set of multiple synchronization signal resources for sidelink shared channel signaling, sidelink feedback channel signaling, or both based on the sidelink synchronization periodicity being less than a periodicity for transmitting the one or more sidelink synchronization signals.

In some examples of the method, apparatuses, and non-transitory computer-readable medium described herein, dynamically configuring the set of multiple synchronization signal resources and the sidelink synchronization periodicity according to a dynamic resource pool partition frame structure.

In some examples of the method, apparatuses, and non-transitory computer-readable medium described herein, selectively transmitting the one or more sidelink synchronization signals may be in accordance with the percentage of UEs associated with the first RAT.

In some examples of the method, apparatuses, and non-transitory computer-readable medium described herein, the percentage of UEs associated with the first RAT within the geographic area further includes a ratio of a first quantity of UEs associated with the first RAT within the geographic area to a sum of the first quantity of UEs and a second quantity of UEs associated with a second RAT within the geographic area.

A method for wireless communications at a first UE is described. The method may include determining that a set of multiple synchronization signal resources are allocated for one or more sidelink synchronization signals associated with a first RAT, selecting a set of multiple resources for communications associated with a second RAT based on determining that the set of multiple synchronization signal resources are allocated, the set of multiple resources being different from the set of multiple synchronization signal resources, and performing the communications associated with the second RAT on the set of multiple resources based on selecting the set of multiple resources.

An apparatus for wireless communications at a first UE is described. The apparatus may include a processor, memory coupled with the processor, and instructions stored in the memory. The instructions may be executable by the processor to cause the apparatus to determine that a set of multiple synchronization signal resources are allocated for one or more sidelink synchronization signals associated with a first RAT, select a set of multiple resources for communications associated with a second RAT based on determining that the set of multiple synchronization signal resources are allocated, the set of multiple resources being different from the set of multiple synchronization signal resources, and perform the communications associated with the second RAT on the set of multiple resources based on selecting the set of multiple resources.

Another apparatus for wireless communications at a first UE is described. The apparatus may include means for determining that a set of multiple synchronization signal resources are allocated for one or more sidelink synchronization signals associated with a first RAT, means for selecting a set of multiple resources for communications associated with a second RAT based on determining that the set of multiple synchronization signal resources are allocated, the set of multiple resources being different from the set of multiple synchronization signal resources, and means for performing the communications associated with the second RAT on the set of multiple resources based on selecting the set of multiple resources.

A non-transitory computer-readable medium storing code for wireless communications at a first UE is described. The code may include instructions executable by a processor to determine that a set of multiple synchronization signal resources are allocated for one or more sidelink synchronization signals associated with a first RAT, select a set of multiple resources for communications associated with a second RAT based on determining that the set of multiple synchronization signal resources are allocated, the set of multiple resources being different from the set of multiple synchronization signal resources, and perform the communications associated with the second RAT on the set of multiple resources based on selecting the set of multiple resources.

Some examples of the method, apparatuses, and non-transitory computer-readable medium described herein may further include operations, features, means, or instructions for receiving, from a co-located node associated with the first RAT, an indication of a time offset for the set of multiple synchronization signal resources, where selecting the set of multiple resources for the communications associated with the second RAT may be based on the indication.

Some examples of the method, apparatuses, and non-transitory computer-readable medium described herein may further include operations, features, means, or instructions for receiving control information indicating a time offset for the set of multiple synchronization signal resources, where selecting the set of multiple resources for the communications associated with the second RAT may be based on the time offset.

Some examples of the method, apparatuses, and non-transitory computer-readable medium described herein may further include operations, features, means, or instructions for receiving, from a second UE, the one or more sidelink synchronization signals associated with the first RAT and determining a time offset for the set of multiple synchronization signal resources, where selecting the set of multiple resources for the communications associated with the second RAT may be based on determining the time offset.

In some examples of the method, apparatuses, and non-transitory computer-readable medium described herein, selecting the set of multiple resources for the communications associated with the second RAT may include operations, features, means, or instructions for allocating a resource of the set of multiple resources for communications associated with the second RAT as a synchronization signal resource for the one or more sidelink synchronization signals associated with the first RAT.

In some examples of the method, apparatuses, and non-transitory computer-readable medium described herein, selecting the set of multiple resources for the communications associated with the second RAT may include operations, features, means, or instructions for determining a percentage of UEs within a geographic area associated with the second RAT and allocating the set of multiple resources for the communications associated with the second RAT based on the percentage.

In some examples of the method, apparatuses, and non-transitory computer-readable medium described herein, selecting the set of multiple resources for the communications associated with the second RAT may include operations, features, means, or instructions for shifting the set of multiple resources for communications associated with the second RAT by a quantity of time intervals.

Some examples of the method, apparatuses, and non-transitory computer-readable medium described herein may further include operations, features, means, or instructions for transmitting an indication of the selected set of multiple resources for the communications associated with the second RAT based on a reference signal received power of the one or more sidelink synchronization signals being below a threshold.

DETAILED DESCRIPTION

A wireless communications system may support user equipment (UEs) that operate using different radio access technologies (RATs). For example, a wireless communications system may include one or more fifth generation (5G) new radio (NR) UEs and one or more long term evolution (LTE) UEs. In some cases, a UE using a first RAT may share time-frequency resources (e.g., operate in a same channel) with a UE using a second RAT. However, a resource configuration for the UE using the first RAT may not account for (e.g., reserve, include) resources for the UE using the second RAT, which may lead to interference between the UEs. For example, the resource configuration may not include synchronization signal resources (e.g., for synchronization signal blocks (SSBs)) for UEs using either RAT. As a result, SSB signaling from UEs using different RATs may collide or interfere with other transmissions, which may degrade performance of the wireless communications system due to interference related transmission failure.

In accordance with aspects of the present disclosure, a UE using a first RAT may perform one or more operations to configure communication resources (e.g., synchronization signal resources) that do not overlap with communication resources for one or more other UEs using different RATs. For example, the UE using the first RAT may configure a set of available resources that includes synchronization signal resources for the UE using the first RAT. The UE may configure the set of available resources based on one or more factors or conditions, such as a penetration ratio for the first RAT, which may be a percentage of UEs associated with the first RAT within a geographic area, and a received indication of a time offset for synchronization signal resources. The time offset may indicate a timing location of the synchronization signal resources to the UE using the first RAT. In some other cases, the UE using the first RAT may determine that one or more resources are allocated for synchronization signal resources for UEs using the second RAT. For example, the UE using the first RAT may receive an indication, or may be configured with an indication, of one or more synchronization signal resources for UEs using the second RAT. Accordingly, the UE using the first RAT may configure a set of available resources to reduce, or prevent, overlap with the synchronization signal resources for UEs using the second RAT.

Aspects of the disclosure are initially described in the context of wireless communications systems. Some aspects of the disclosure are further described with reference to resource configurations that enable resource sharing between sidelink devices using different RATs. Aspects of the disclosure are further illustrated by and described with reference to apparatus diagrams, system diagrams, and flowcharts that relate to resource sharing between sidelink devices using different RATs.

Figure 1:
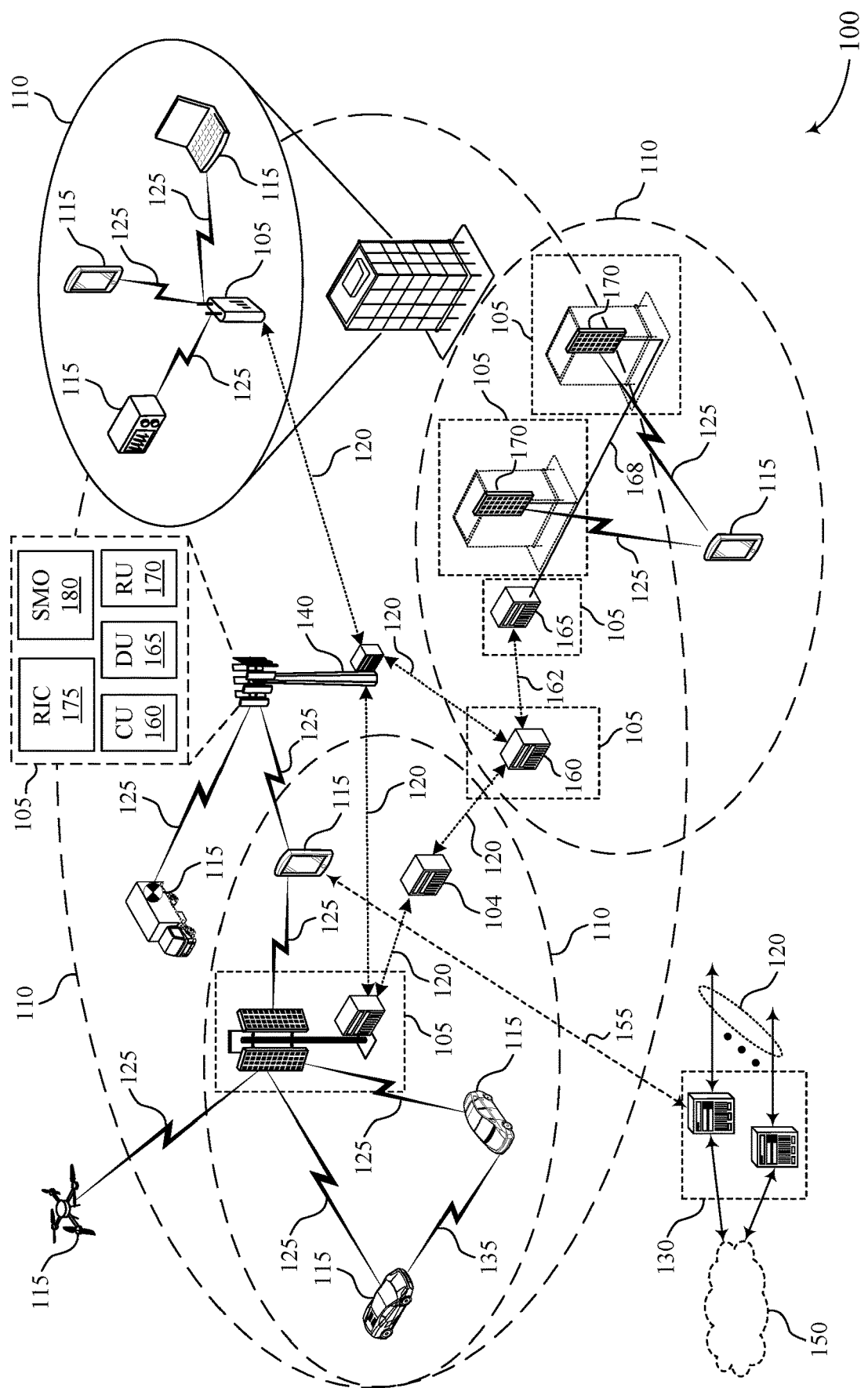
FIGS. 1 and 2 illustrate examples of wireless communications systems that support resource sharing between sidelink devices using different radio access technologies (RATs) in accordance with one or more aspects of the present disclosure.

FIG. 1 illustrates an example of a wireless communications system 100 that supports resource sharing between sidelink devices using different RATs in accordance with one or more aspects of the present disclosure. The wireless communications system 100 may include one or more network entities 105, one or more UEs 115, and a core network 130. In some examples, the wireless communications system 100 may be an LTE network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more RATs.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170).

A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support resource sharing between sidelink devices using different RATs as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given RAT (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different RATs.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A UE 115 may configure a communication set of available resources that includes one or more resources for sidelink synchronization signals. The one or more resources for sidelink synchronization signals may include one or more resources for a first RAT and one or more resources for a second RAT. In some cases, the UE 115 may configure the set of available resources based on one or more factors or conditions, such as a penetration ratio for the first RAT, which may be a percentage of UEs 115 using the first RAT within a geographic area, and an indication of a time offset for synchronization signal resources. The time offset may indicate a timing location of the synchronization signal resources to the UE 115 using the first RAT. In some other cases, the UE 115 using the first RAT may determine that one or more resources are allocated for synchronization signal resources for UEs 115 using the second RAT. For example, the UE 115 using the first RAT may receive an indication or may be configured with an indication of one or more synchronization signal resources for UEs 115 using the second RAT. In some other cases, the UE 115 using the first RAT may receive a synchronization signal from the UE 115 using the second RAT, and may configure one or more resources based on receiving the synchronization signal from the UE 115 using the second RAT. Accordingly, the UE 115 using the first RAT may account for sidelink synchronization signals of the first RAT and the second RAT and may thereby reduce or eliminate interference, among other advantages.

Figure 2:
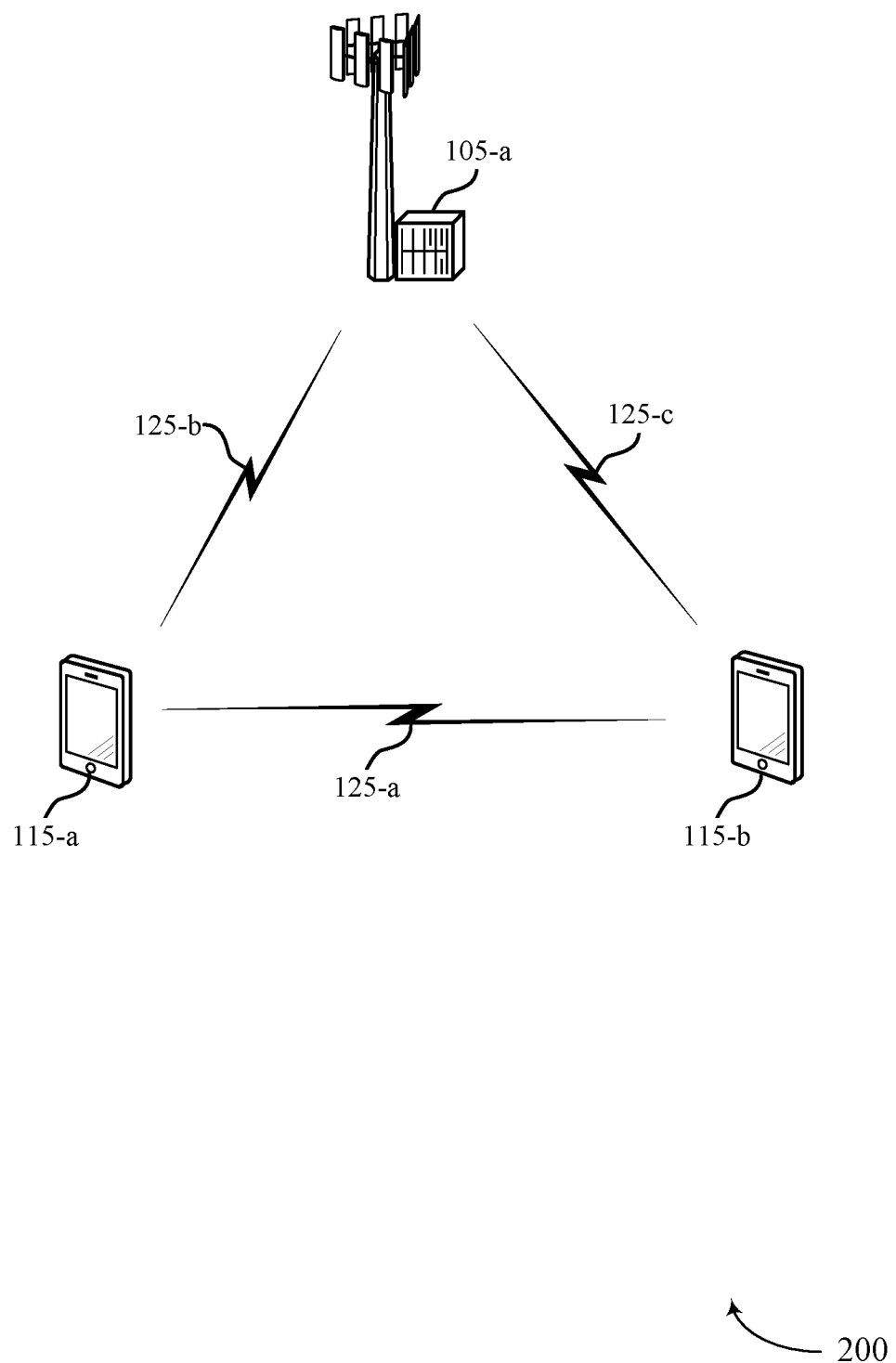

FIG. 2 illustrates an example of a wireless communications system 200 that supports resource sharing between sidelink devices using different RATs in accordance with one or more aspects of the present disclosure. The wireless communications system 200 may implement aspects of the wireless communications system 100. For example, the wireless communications system 200 may include a UE 115-*a* and a UE 115-*b*, which may be examples of UEs 115 as described with reference to FIG. 1. Additionally, or alternatively, the wireless communications system 200 may include a network entity 105-*a*, which may be an example of a network entity 105 as described with reference to FIG. 1. The UEs 115 and the network entity 105-*a* may communicate using a communication link 125-*b* and a communication link 125-*c*, which may be examples of communication links 125 as described with reference to FIG. 1. The UEs 115 may communicate (e.g., sidelink communications) using a communication link 125-*a*, which may be an example of the communication link 125 as described with reference to FIG. 1.

The UEs 115 may communicate using different RATs. In some cases, the UE 115-*a* may communicate using a first RAT and the UE 115-*b* may communicate using a second RAT. For example, the UE 115-*a* may communicate using a 5G NR network and the UE 115-*b* may communicate using an LTE network. In some cases, as described herein, a UE 115 may be capable of communicating using more than one RAT. For example, the UE 115-*a* may be configured for communications using the first RAT and the second RAT.

That is, the UE 115-*a* may be a dual-radio device, in which the UE 115-*a* may include one or more components for communications using the first RAT and one or more components for communications using the second RAT. For example, the UE 115 may include an NR 5G node and an LTE node.

In some cases, the UEs 115 may be examples of vehicles in a V2X system. The UEs 115 may communicate some V2X signaling using the first RAT and some other V2X signaling using the second RAT. For example, the UE 115-*a* may transmit basic safety message (BSM) and cooperative awareness message (CAM) packets using LTE signaling. Additionally, or alternatively, the UE 115-*a* may transmit sensor sharing messages and other traffic using 5G NR signaling. Additionally, or alternatively, the UEs 115 may communicate other signaling (e.g., not associated with V2X communications) using one or more RATs.

Although the UEs 115 may be associated with, or use, different RATs, the UEs 115 may communicate using a same channel. That is, one or more wireless channels may be shared by the UEs 115. In some cases, the one or more wireless channels shared by the UEs 115 may include one or more wireless channels in an unlicensed spectrum. In some other cases, the one or more wireless channels shared by the UEs 115 may not be in an unlicensed spectrum (e.g., may be in licensed spectrum). In some cases, the UE 115-*a* and the UE 115-*b* may communicate using overlapping time-frequency resources (e.g., on the same channel), which may result in interference between the UEs 115. The UEs 115 may communicate using the overlapping time-frequency resources because a resource configuration (e.g., a set of available resources) for the UE 115-*a* may not include resources for the UE 115-*b*, and vice versa. Additionally, or alternatively, the set of available resources for the UE 115-*a* may not include sidelink synchronization signal resources for the first RAT or the second RAT.

As described herein, a UE 115-*a*, a UE 115-*b*, or both may configure communication resources (e.g., a set of available resources) for communications at the UE 115-*a* and the UE 115-*b*. For example, the UE 115-*a* may configure communication resources for transmitting and receiving signaling at the UE 115-*a*. Similarly, the UE 115-*b* may configure communication resources for transmitting and receiving signaling at the UE 115-*b*. In some cases, the set of available resources may include resources for communications using more than one RAT. For example, the UE 115-*a*, which may communicate using the first RAT, may configure a set of available resources that includes resources for communications using the first RAT and the second RAT. Described another way, the UE 115-*a* may partition the set of available resources for communications using more than one RAT.

The set of available resources may include (e.g., reserve) time-frequency resources for various transmission types at a UE 115-*a*, a UE 115-*b*, or both. For example, the set of available resources may include one or more TTIs for communications using a respective RAT, such as the first RAT or the second RAT. Additionally, or alternatively, the set of available resources may include one or more TTIs for FDM communications between multiple RATs. For example, the UE 115-*a* may multiplex transmissions using the first RAT and the second RAT. The UE 115-*a* may multiplex the transmissions during the one or more TTIs for FDM communications between multiple RATs. In some cases, the set of available resources may include one or more resources for a specific channel. For example, the set of available resources may include one or more resources for physical sidelink feedback channel (PSFCH) communications, which may be associated with a specific RAT. Additionally, or alternatively, the set of available resources may include one or more resources for physical sidelink broadcast channel (PSBCH) communications.

A UE 115 may configure communication resources (e.g., partition a set of available resources) based on a quantity of UEs 115 associated with a specific RAT within a geographic area (e.g., a penetration ratio). Additionally, or alternatively, the UE 115 may configure communication resources based on one or more indications (e.g., one or more received signal strength indicators (RSSIs), one or more configuration indications). For example, the UE 115-*a* may receive, from the network entity 105-*a* or from the UE 115-*b*, an indication including a configuration for communication resources. The UE 115-*a* may then configure the communication resources based on the indication. In some other cases, the UE 115-*a* may perform one or more operations to determine an RSSI ranking for one or more communication resources (e.g., time-frequency resources). The UE 115 may then configure communication resources to exclude or avoid one or more communication resources with a relatively high RSSI ranking when compared to RSSI rankings for other resources, such that the UE 115 may back off from resources where the RSSI is relatively high. In some cases, a UE 115 may configure communication resources based on any combination of parameters or received indications.

As described herein, the phrase "penetration ratio" may be understood to refer to a penetration ratio of UEs 115 that communicate using the first RAT. For example, the term "penetration ratio" may be used to describe a quantity of UEs 115 that communicate using the first RAT relative to a quantity of UEs 115 that communicate using the second RAT. That is, a relatively high penetration ratio may correspond to a geographic area including more UEs that communicate using the first RAT than UEs that communicate using the second RAT.

In some cases, a UE 115 may transmit sidelink synchronization signal blocks (S-SSBs), which may enable the UE 115 to establish sidelink connections. An S-SSB may be associated with, or configured for, a specific RAT. For example, an S-SSB for the first RAT may be different from an S-SSB for the second RAT. In some cases, the UE 115 may transmit (e.g., broadcast) multiple S-SSBs at a periodicity, which may be based on a RAT of the UE 115. In some cases, however, a UE 115 may configure a set of available resources, which may not include (e.g., reserve, account for) resources for sidelink synchronization signal blocks (S-SSBs) associated with either RAT. For example, the UE 115-*a* may not reserve resources for S-SSB signaling associated with the first RAT or the second RAT. In such cases, the UE 115 may transmit one or more S-SSBs, which may collide with one or more other transmissions.

In accordance with aspects of the present disclosure, a UE 115 may configure communication resources that include one or more resources for S-SSBs that do not overlap with communication resources for one or more other UEs 115. Additionally, or alternatively, the UE 115 may configure the communication resources to include (e.g., reserve) S-SSB resources for multiple RATs. For example, the UE 115-*a*, may configure a set of available resources including one or more S-SSB resources for 5G NR and one or more S-SSB resources for LTE. Accordingly, the resource configuration may enable the UE 115-*a* to reduce or eliminate interference associated with S-SSB communications in environments where UEs 115 communicate using multiple RATs. The UE 115 may configure the communication resources based on one or more factors or conditions, such as a penetration ratio of UEs 115 associated with a specific RAT.

The UE 115 may receive an indication of a time offset for S-SSB resources and the UE 115 may configure the communication resources based on the time offset. Additionally, or alternatively, the UE 115-*a* may determine that one or more resources are allocated for UEs 115 using different RATs (e.g., via one or more received indications) and the UE 115-*a* may configure the communication resources based on the determination. The UE 115 may determine a location (e.g., a timing location) of one or more resources included in a set of available resources based on the indication of the time offset. For example, the UE 115 may determine a location of one or more resources for the first RAT, one or more resources for the second RAT, or both, based on the indication of the time offset. The UE 115 may receive the indication of the time offset from the network entity 105-*a* over a communication link 125. The time offset may be a sidelink synchronization offset and may be indication by a sidelink synchronization offset indicator variable (e.g., SL-Sync-Offset-Indicator).

Additionally, or alternatively, the UE 115-*a* may determine a location of one or more synchronization signal resources and a sidelink synchronization periodicity based on the indication and the penetration ratio (e.g., the penetration ratio of UEs 115 using the first RAT). The UE 115-*a* may then transmit one or more synchronization signals using the one or more synchronization signal resources. The UE 115-*a* may transmit the one or more synchronization signals at the sidelink synchronization periodicity. The UE 115-*a* may transmit the one or more synchronization signals over a communication link 125. In some cases, the UE 115-*b* may receive the one or more synchronization signals.

In some cases, the UE 115-*a* may determine the location of the one or more synchronization signal resources based on determining that other synchronization signal resources are allocated for other RATs. For example, the UE 115-*b* may transmit one or more synchronization signals using the second RAT, which may be received by the UE 115-*a*. In some cases, the UE 115-*b* may transmit the one or more synchronization signals over the communication link 125-*a*. The UE 115-*a* may receive the one or more synchronization signals and determine that the other synchronization signal resources are allocated for the second RAT. Accordingly, the UE 115-*a* my determine the location of the one or more synchronization signal resources (e.g., for the first RAT) based on determining that the other synchronization signal resources are allocated for the second RAT.

Figure 3A:
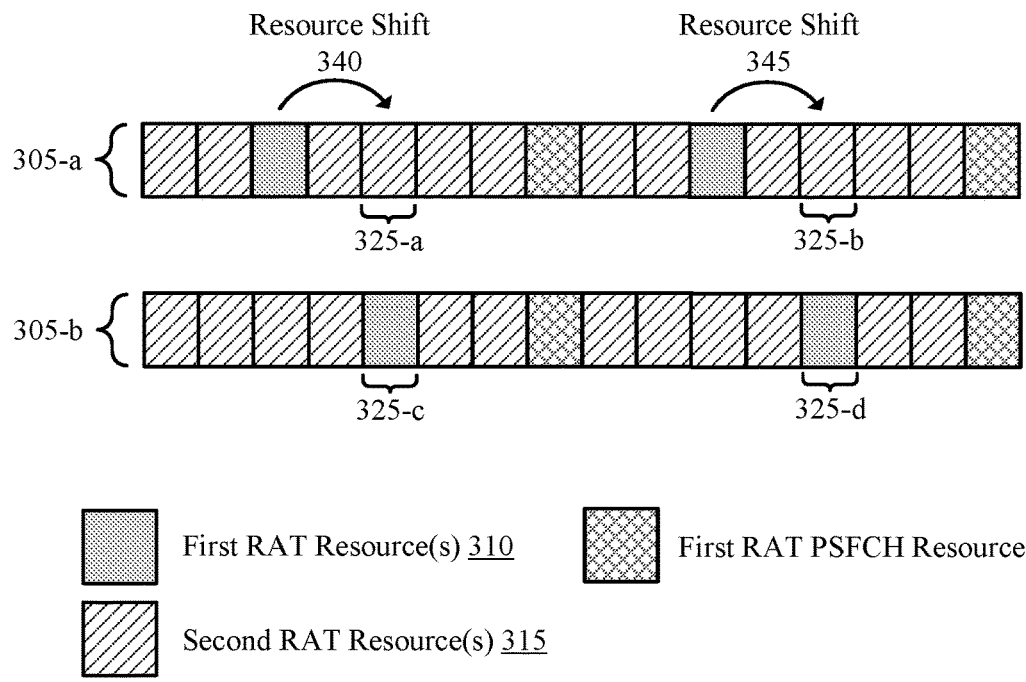
FIGS. 3A and 3B illustrate examples of resource configurations that support resource sharing between sidelink devices using different RATs in accordance with one or more aspects of the present disclosure.

FIG. 3A illustrates an example of a resource configuration 300-*a* that supports resource sharing between sidelink devices using different RATs in accordance with one or more aspects of the present disclosure. One or more aspects of the resource configuration 300-*a* may be implemented by one or more wireless devices included in the wireless communications system 100, the wireless communications system 200, or both, as described with reference to FIGS. 1 and 2. For example, one or more aspects of the resource configuration 300-*a* may be implemented by one or more UEs 115, as described with reference to FIGS. 1 and 2. The resource configuration 300-*a* may include a set of available resources 305-*a* and a set of available resources 305-*b*. In some cases, a UE 115 (e.g., a UE 115 using the first RAT) may configure a set of available resources 305 to include one or more first RAT resources 310 and one or more first RAT PSFCH resources 320. The set of available resources 305 may also include one or more other resources, which are not explicitly reserved by the UE 115 (e.g., one or more second RAT resources 315). For example, the UE 115 may use one or more resources not configured for transmissions using the first RAT for second RAT transmissions.

A UE 115 may configure a set of available resources 305 (e.g., for sidelink communications with other UEs 115), which may include one or more slots. A slot may be a dynamic scheduling unit in a time-domain for communications between one or more wireless devices (e.g., UEs, network entities, or both). In accordance with aspects of the present disclosure, the UE 115 may include one or more resources in the set of available resources 305, which may be utilized for transmitting sidelink synchronization signals (e.g., S-SSBs). For example, the UE 115 may configure the set of available resources 305-*a* to include one or more first RAT resources 310, which may be utilized by the UE 115 for transmitting sidelink synchronization signals. In accordance with examples as described herein, a UE 115 associated with a specific RAT may be configured to transmit one or more synchronization signals using one or more resources for the specific RAT and avoid transmitting one or more synchronization signals using one or more resources for other RATs. Accordingly, one or more first RAT resources 310 may be examples of sidelink synchronization resources for a UE 115 using the first RAT, such as the UE 115-*a* as described with reference to FIG. 2. Similarly, one or more second RAT resources 315 may be examples of sidelink synchronization resources for a UE 115 using the second RAT, such as the UE 115-*b* as described with reference to FIG. 2.

The UE 115 may determine a location (e.g., a timing location) of one or more resources included in the set of available resources 305 based on an indication of a time offset. For example, the UE 115 may determine a location of one or more first RAT resources 310 based on an indication of a time offset. The UE 115 may receive the indication of the time offset from a network entity, such as a network entity 105 as described with reference to FIGS. 1 and 2. In some other cases, the UE 115 may be preconfigured with the time offset. The time offset may be a sidelink synchronization offset and may be indicated by a sidelink synchronization offset indicator variable (e.g., SL-Sync-Offset-Indicator) in control signaling.

The UE 115 may transmit S-SSBs according to a sidelink synchronization periodicity. In some cases, the UE 115 may configure the set of available resources 305 for the sidelink synchronization periodicity. That is, the set of available resources 305 may have a same duration as the sidelink synchronization periodicity. For example, the sidelink synchronization periodicity may be 160 milliseconds (ms) and the UE 115 may configure the set of available resources 305 to have a duration of 160 ms. Accordingly, if the set of available resources 305 has the same duration as the sidelink synchronization periodicity, the set of available resources 305 may include a first RAT resource 310 (e.g., a single resource), which may be used for transmitting a sidelink synchronization signal.

In some other cases, the UE 115 may configure the set of available resources 305 for an integer multiple of the sidelink synchronization periodicity. For example, the UE 115 may configure the set of available resources 305 to have a duration an integer multiple of (e.g., twice as long as) a sidelink synchronization periodicity. Accordingly, if the UE 115 configures the set of available resources 305 for an integer multiple of the sidelink synchronization periodicity, the set of available resources 305 may include multiple sidelink synchronization resources (e.g., multiple first RAT resources). For example, if the set of available resources 305 has a duration of 320 ms and the sidelink synchronization periodicity is 160 ms, the set of available resources 305 may include two sidelink synchronization resources.

The UE 115 may configure the set of available resources 305 based on one or more synchronization resources (e.g., based on a location of one or more synchronization resources in the set of available resources 305, based on a quantity of one or more synchronization resources in the set of available resources 305, or both). That is, the UE 115 may configure one or more other resources (e.g., first RAT resources 310 not used for synchronization signaling, second RAT resources 315, first RAT PSFCH resources 320) based on one or more synchronization resources. For example, if a sidelink synchronization periodicity is 160 slots, and a set of available resources 305 includes one sidelink synchronization resource, the UE 115 may configure the set of available resources 305 to include 29 slots for first RAT resources 310 and first RAT PSFCH resources 320, and 120 slots for second RAT resources 315.

Additionally, or alternatively, the UE 115 may configure the set of available resources 305, determine a sidelink synchronization periodicity, or both based on a quantity of UEs 115 using a first RAT relative to a quantity of UEs 115 using one or more other RATs (e.g., a penetration ratio, a channel occupancy, a ratio of UEs 115 associated with the first RAT to UEs 115 associated with the second RAT) within a coverage area. As an illustrative example, an NR 5G penetration ratio, which may be used to determine a set of available resources 305, may be defined by Equation 1:

$$\eta = \frac{\text{Number of } NR \text{ } UEs}{\text{Number of } NR \text{ } UEs + \text{Number of } LTE \text{ } UEs} \quad (1)$$

In some cases, where $\eta \geq 0.5$, a 5G NR, a sidelink synchronization periodicity may be 80 ms. Where $0.25 \leq \eta < 0.5$, the 5G NR sidelink synchronization periodicity may be 160 ms. Where $\eta < 0.25$, the 5G NR sidelink synchronization periodicity may be 320 ms. In some cases, the UE 115 may use a different calculation or method for determining the penetration ratio based on one or more local network configurations.

The UE 115 may transmit an indication of a sidelink synchronization periodicity in a master information block (MIB). In some cases, the UE 115 may transmit the MIB using one or more PSBCH resources (e.g., one or more first RAT resources 310). In some cases, the UE 115 may receive one or more indications of the sidelink synchronization periodicities from one or more other UEs 115. In such cases, the UE 115 may update the sidelink synchronization periodicity. If the UE 115 receives one or more indications of the sidelink synchronization periodicities, the UE 115 may compare the one or more received sidelink synchronization periodicities to a self-estimate of the sidelink synchronization periodicity and may determine to use a highest value for the sidelink synchronization periodicity. In some other cases, the UE 115 may determine to use the highest value for the sidelink synchronization periodicity if a reference signal received power (RSRP) for a received indication of a sidelink synchronization periodicity is above a threshold RSRP. The threshold RSRP value may be configured, or otherwise defined, at the UE 115 (e.g., via control signaling from a network entity 105). In some other cases, the UE 115 may determine to use the self-estimate of the sidelink synchronization periodicity regardless of whether the UE 115 receives indications of other sidelink synchronization periodicities.

In some cases, the UE 115 may reuse (e.g., repurpose, reconfigure) one or more sidelink synchronization resources based on whether one or more other UEs 115 are transmitting sidelink synchronization signals (e.g., S-SSBs). For example, the UE 115 may not receive or detect any S-SSBs from other UEs 115 within a geographic region and may determine to reconfigure one or more sidelink synchronization resources based on the absence of received S-SSBs. Additionally, or alternatively, the UE 115 may communicate one or more other signals on the one or more sidelink synchronization resources. For example, the UE 115 may transmit one or more PSBCH messages using the one or more sidelink synchronization resources. The UE 115 may configure the set of available resources 305 with a smaller granularity than a sidelink synchronization periodicity. For example, the UE 115 may define the set of available resources 305 for a duration of 20 ms while an S-SSB periodicity is 160 ms.

In some cases, the UE 115-*a*, which may use the first RAT, may determine that one or more sidelink synchronization resources overlap with one or more first RAT resources 310. In such cases, the UE 115-*a* may transmit one or more S-SSBs using the one or more sidelink synchronization resources (e.g., instead of transmitting a different transmission type using the first RAT during the first RAT resources 310).

In some cases, transmitting one or more S-SSBs using the one or more sidelink synchronization resources may eliminate or reduce interference with signaling for the second RAT. For example, the UE 115-*a* may transmit one or more S-SSBs using the one or more sidelink synchronization resources as an alternative to transmitting the one or more S-SSBs using one or more second RAT resources 315. Additionally, or alternatively, the UE 115-*b* may reserve the one or more sidelink synchronization resources for receiving the one or more S-SSBs and may not refrain from receiving or transmitting transmissions using the second RAT during the one or more sidelink synchronization resources. Additionally, or alternatively, the UE 115-*a* may indicate a periodicity for the one or more S-SSBs in the MIB, which may enable resource coherence between the UE 115-*a* and other UEs 115 using the first RAT. For example, one or more other UEs 115 may receive the indication of the periodicity and configure resources based on the indication.

In some other cases, the UE 115 may determine that one or more sidelink synchronization resources overlap with one or more second RAT resources 315. For example, the set of available resources 305-*a* may include a TTI 325-*a*, which may include a second RAT resource 315 that overlaps with a sidelink synchronization resource. Additionally, or alternatively, the set of available resources 305-*b* may include a TTI 325-*b*, which may include a second RAT resource 315 that overlaps with a sidelink synchronization resource. In such cases, the UE 115 may determine a priority of the second RAT resources 315 and refrain from transmitting one or more S-SSBs using the resources if the priority of the second RAT resources 315 is greater than a priority of the first RAT resources 310. In some other cases, the UE 115-*a* may transmit the one or more S-SSBs regardless of the priority of the second RAT resources 315.

If one or more sidelink synchronization resources overlap with one or more second RAT resources 315, the UE 115 may shift non-PSFCH resources by a fixed value. Shifting the non-PSFCH resources may result in the one or more sidelink synchronization resources overlapping with one or more first RAT resources 310. For example, at 340 and at 345, the UE 115 may shift the first RAT resources 310 and the second RAT resources 315 included in set of available resources 305-a by two slots. The set of available resources 305-b may show the shifted resources. For example, the TTI 325-c may overlap with the first RAT resource 310 and the TTI 325-d may overlap with the first RAT resource 310. Accordingly, the UE 115 may transmit one or more sidelink synchronization resources using the first RAT resources 310 without interfering with transmissions on one or more second RAT resources 315.

Figure 3B:
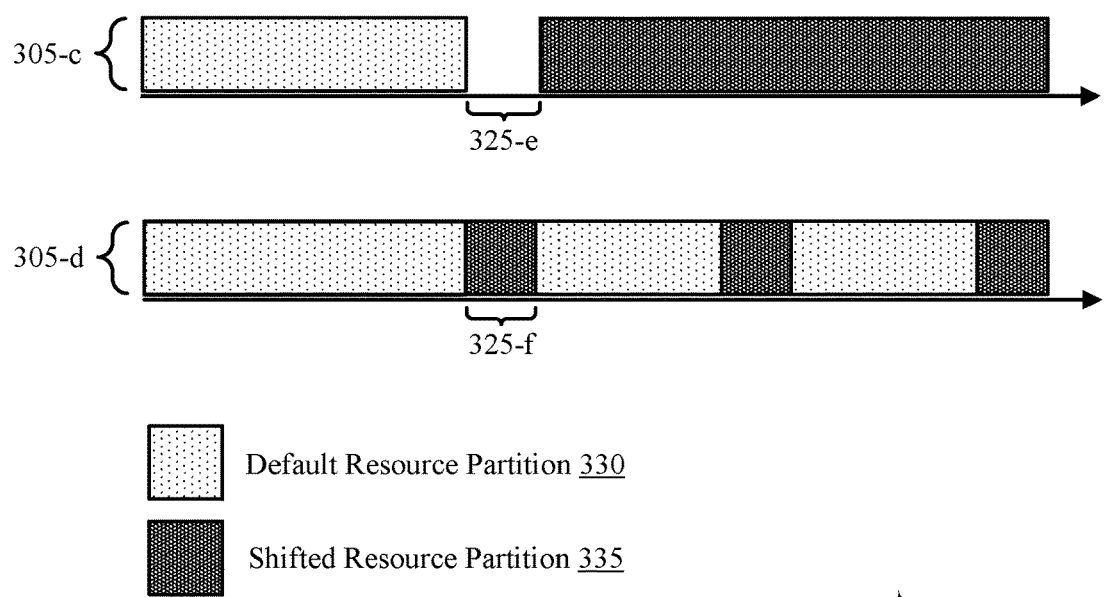

FIG. 3B illustrates an example of a resource configuration 300-b that supports resource sharing between sidelink devices using different RATs in accordance with one or more aspects of the present disclosure. One or more aspects of the resource configuration 300-b may be implemented by one or more wireless devices included in the wireless communications system 100, the wireless communications system 200, or both, as described with reference to FIGS. 1 and 2. For example, one or more aspects of the resource configuration 300-b may be implemented by one or more UEs 115, as described with reference to FIGS. 1 and 2. The resource configuration 300-b may include a set of available resources 305-c and a set of available resources 305-d. In some cases, a set of available resources 305 may include one or more default resource partitions 330 and one or more shifted resource partitions 335.

As described herein, a UE 115 may shift one or more communication resources (e.g., to align the one or more communication resources with synchronization signal transmissions). The UE 115 may shift the one or more communication resources included in a shifted resource partition 335. Additionally, or alternatively, the UE 115 may not shift the one or more communication resources included in a default resource partition 330. The shifted resource partition 335 may be span a duration, a quantity of resources, or both. For example, the shifted resource partition 335 may include one or more TTIs 325. The UE 115 may communicate using one or more communication resources included in the shifted resource partition 335 for a duration. Similarly, the default resource partition 330 may span a duration, a quantity of resources, or both. For example, the default resource partition 330 may include one or more TTIs 325. The UE 115 may communicate using one or more communication resources included in the default resource partition 330 for a duration.

In some cases, as shown by the set of available resources 305-c, the UE 115 may communicate using the shifted resource partition 335 after transmitting a synchronization signal. For example, the UE 115 may transmit a synchronization signal during the TTI 325-e. The UE 115 may then communicate using the shifted resource partition 335 based on transmitting the synchronization signal during the TTI 325-e. Additionally, or alternatively, the UE 115 may indicate a shift value in an MIB. In some cases, the UE 115 may transmit the MIB indicating the shift value during the TTI 325-e. In some cases, the UE 115 may communicate using the shifted resource partition 335 based on transmitting the shift value in the MIB. In some cases, the UE 115 may communicate using the shifted resource partition 335 until a penetration ratio for a geographic region associated with the UE 115 changes.

In some cases, as shown by the set of available resources 305-d, the UE 115 may communicate using the shifted resource partition 335 for synchronization signal transmissions. For example, the UE 115 may transmit a synchronization signal during the TTI 325-f. Accordingly, the UE 115 may communicate using the shifted resource partition 335 during the TTI 325-f. The UE 115 may communicate using the shifted resource partition 335 during any other TTIs 325 where the UE 115 transmits synchronization signals. The UE 115 may periodically communicate using the shifted resource partition 335 based on a synchronization signal periodicity. The UE 115 may communicate using the default resource partition 330 when the UE 115 is not transmitting synchronization signals.

Figure 4A:
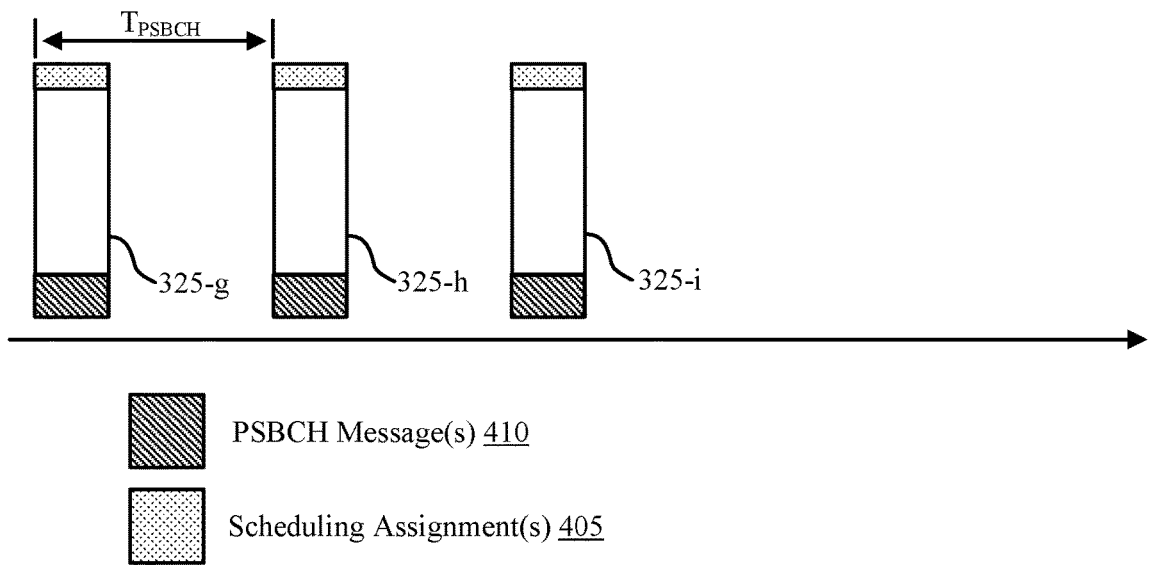
FIGS. 4A and 4B illustrate examples of resource configurations that support resource sharing between sidelink devices using different RATs in accordance with one or more aspects of the present disclosure.

FIG. 4A illustrates an example of a resource configuration 400-a that supports resource sharing between sidelink devices using different RATs in accordance with one or more aspects of the present disclosure. One or more aspects of the resource configuration 400-a may be implemented by one or more wireless devices included in the wireless communications system 100, the wireless communications system 200, or both, as described with reference to FIGS. 1 and 2. For example, one or more aspects of the resource configuration 400-a may be implemented by one or more UEs 115, as described with reference to FIGS. 1 and 2. The resource configuration 400-a may include one or more scheduling assignments (SAs) 405, which may be transmitted by a UE 115 during one or more TTIs 325. In some cases, as described herein, the UE 115 may multiplex an SA 405 with a PSBCH message 410.

As described with reference to FIG. 2, one or more UEs 115 may share a channel, where the UEs 115 may communicate using a first RAT and a second RAT. In some cases, a UE 115 that communicates using the first RAT may not account for or reserve resources associated with the second RAT. Additionally, or alternatively, a UE that communicates using the second RAT may not account for or reserve resources associated with the first RAT. As a result, the UEs 115 may transmit signaling (e.g., S-SSB signaling transmitted over a PSBCH), which may result in interference. For example, the UE 115 that communicates using the second RAT may transmit PSBCH signaling using the second RAT and the PSBCH signaling may collide with one or more PSBCH signals transmitted by the UE 115 using the first RAT.

In some cases, the UEs 115 may perform one or more procedures to minimize interference with other UEs 115. For example, a UE 115 may rank one or more resources based on an RSSI and determine whether to transmit signaling using the one or more resources based on the ranking. The UE 115 may receive signaling from another UE 115 and may determine an RSSI for the received signaling. In some cases, the UE 115 may determine whether the RSSI for the received signaling is above or below a threshold value. In some cases, the UE 115 may determine not to transmit signaling using one or more resources associated with the RSSI if the RSSI is above the threshold value. In such cases, the other UE 115 may avoid interference with the UE 115 based on the UE 115 performing the one or more procedures including ranking one or more RSSIs.

In some other cases, as shown with reference to FIG. 4A, a UE 115 that communicates using the first RAT may perform one or more operations to reduce or eliminate interference with the UE 115 that communicates using the second RAT. For example, the UE 115 that communicates using the first RAT may transmit one or more SAs 405 to the other UE 115, which may schedule resources for the other UE 115 to transmit signaling using the second RAT that does not interfere with signaling transmitted by the UE 115 that communicates using the first RAT. The one or more SAs 405 may be for UEs 115 that communicate using the second RAT. In some cases, a UE 115 may transmit the SA 405 during a same TTI 325 as a PSBCH message 410 (e.g., an S-SSB). For example, the UE 115 may use FDM to transmit the SA 405 and the PSBCH message 410 simultaneously.

The SA 405 may configure one or more resources including one or more resources scheduling communications using the first RAT. For example, the SA 405 may include an indication of the resources associated with the first RAT. Accordingly, a UE 115, which may communicate using the second RAT, may receive the indication and configure resources for communications using the second RAT based on the indication of the resources for communications using the first RAT. For example, the UE 115 may receive the SA 405, which may indicate one or more resources for the first RAT. Based on the indicated one or more resources for the first RAT, the UE 115 may determine to avoid transmitting S-SSBs for the second RAT on the indicated one or more resources for the first RAT.

In some cases, an SA 405 may include a PSBCH periodicity, TPSBCH, for the first RAT. For example, the SA 405 may indicate a periodicity of S-SSB resources for 5G NR. In some cases, an SA 405 may include an indication of scheduled resources for a TTI 325. For example, the UE 115-a may transmit an SA 405 during a TTI 325-g, which may indicate scheduled resources for a TTI 325-h. Similarly, the UE 115-a may transmit an SA 405 during the TTI 325-h, which may indicate scheduled resources for a TTI 325-i.

Figure 4B:
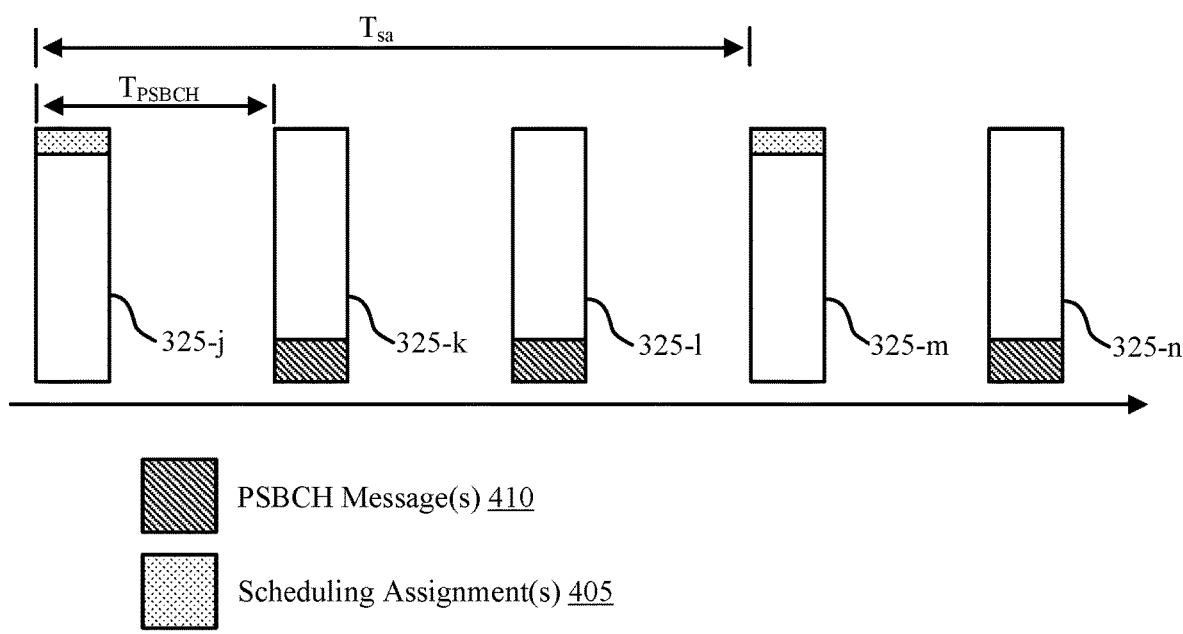

FIG. 4B illustrates an example of a resource configuration 400-b that supports resource sharing between sidelink devices using different RATs in accordance with one or more aspects of the present disclosure. One or more aspects of the resource configuration 400-b may be implemented by one or more wireless devices included in the wireless communications system 100, the wireless communications system 200, or both, as described with reference to FIGS. 1 and 2. For example, one or more aspects of the resource configuration 400-b may be implemented by one or more UEs 115, as described with reference to FIGS. 1 and 2. The resource configuration 400-b may include one or more SAs 405, which may be transmitted by a UE 115 during one or more TTIs 325.

In some cases, the UE 115 may avoid transmitting (e.g., may mute) one or more PSBCH messages 410 during a TTI 325 including an SA 405. For example, the UE 115 may transmit an SA 405 during a TTI 325-j and may not transmit a PSBCH message 410 during the TTI 325-j. In some cases, the UE 115 may transmit an SA 405 and may subsequently transmit one or more PSBCH messages 410. For example, the UE 115 may transmit the SA 405 during the TTI 325-j and may transmit PSBCH messages 410 during the TTI 325-k and the TTI 325-l. Additionally, or alternatively, the UE 115 may transmit the SA 405 during the TTI 325-m and may transmit PSBCH messages 410 during the TTI 325-n.

The UE 115 may transmit SAs 405 at an SA periodicity, TSA, which may include one or more TTIs 325. For example, the SA periodicity may include the TTI 325-j, the TTI 325-k, and the TTI 325-l. In some cases, the UE 115 may transmit multiple SAs 405 at the SA periodicity. Additionally, or alternatively, the UE 115 may transmit PSBCH messages 410 at a PSBCH periodicity, TPSBCH. The PSBCH periodicity may include one or more TTIs 325. For example, the PSBCH periodicity may include the TTI 325-j. In some cases, the UE 115 may determine to avoid transmitting PSBCH messages 410 for a specific TTI 325 (e.g., where an SA 405 is transmitted) regardless of the PSBCH periodicity. For example, the UE 115 may transmit PSBCH messages 410 based on the PSBCH periodicity, the presence of an SA 405 during a TTI 325, or both. In some cases, the UE 115 may transmit one or more SAs 405 as described with reference to FIGS. 4A and 4B in addition to performing one or more operations for shifting resources as described with reference to FIGS. 3A and 3B.

Figure 5:
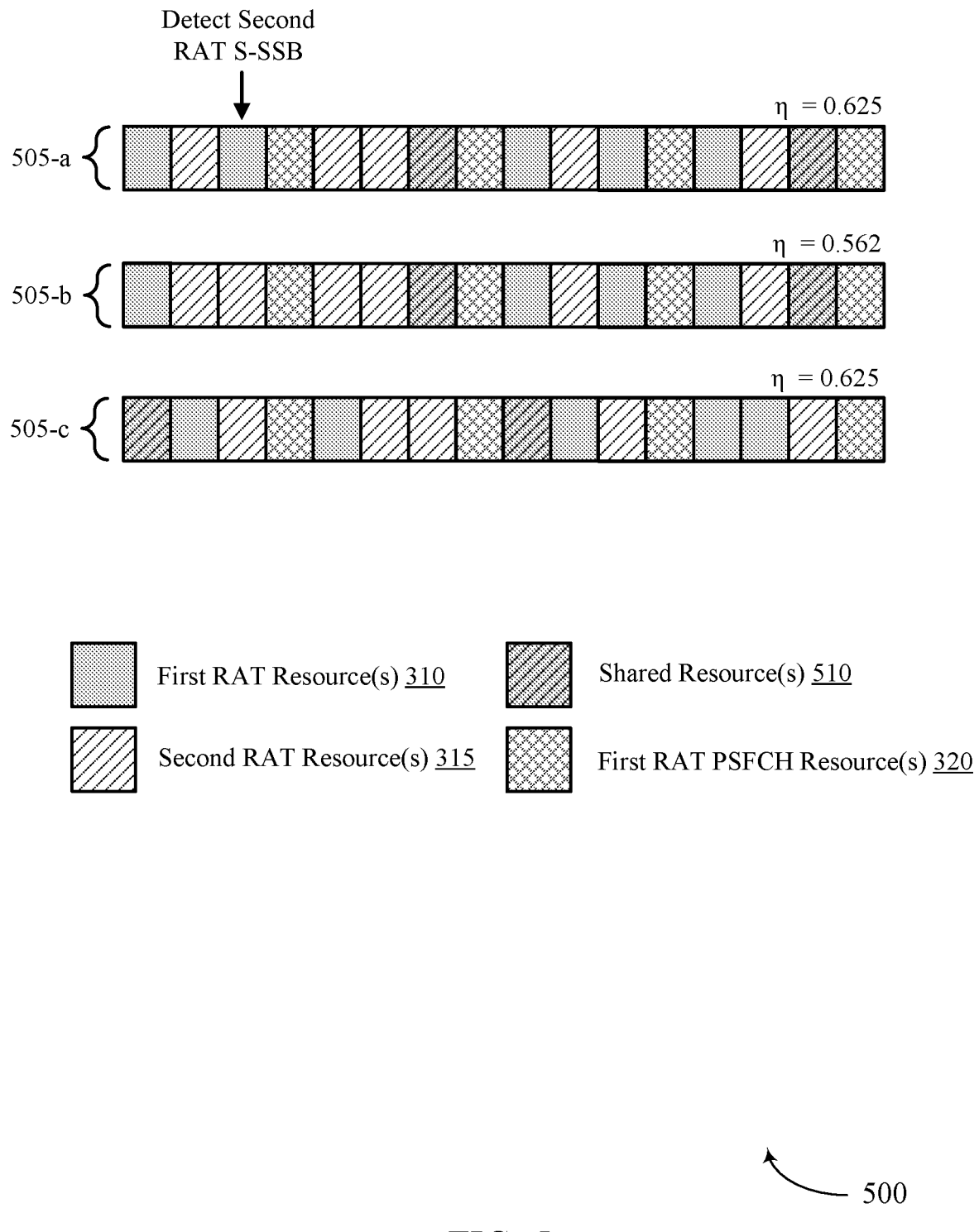
FIG. 5 illustrates an example of a resource configuration that supports resource sharing between sidelink devices using different RATs in accordance with one or more aspects of the present disclosure.

FIG. 5 illustrates an example of a resource configuration 500 that supports resource sharing between sidelink devices using different RATs in accordance with one or more aspects of the present disclosure. One or more aspects of the resource configuration 500 may be implemented by one or more wireless devices included in the wireless communications system 100, the wireless communications system 200, or both, as described with reference to FIGS. 1 and 2. For example, one or more aspects of the resource configuration 500 may be implemented by one or more UEs 115, as described with reference to FIGS. 1 and 2. The resource configuration 500 may include a set of available resources 505-a, a set of available resources 505-b, and a set of available resources 505-c. In some cases, a UE 115 (e.g., a UE 115 using the first RAT) may configure a set of available resources 505 to include one or more first RAT resources 310, one or more first RAT PSFCH resources 320, and one or more shared resources 510. The set of available resources 505 may also include one or more other resources, which are not explicitly reserved by the UE 115 (e.g., one or more second RAT resources 315). For example, the UE 115 may use one or more resources not configured for transmissions using the first RAT for second RAT transmissions.

A UE 115 may configure a set of available resources 505 in accordance with a penetration ratio, such that each penetration ratio may result in a different configuration for the set of available resources 505. The UE 115 may determine a penetration ratio based on a quantity of UEs 115 that communicate using a first RAT relative to a quantity of UEs 115 that communicate using a second RAT (e.g., NR vs. LTE). The UE 115 may determine the penetration ratio for a defined geographic area, such as a coverage area for the UE 115. A set of available resources 505-a may correspond to a penetration ratio of 0.625. In some cases, configuring the set of available resources 505-a may include determining a quantity of first RAT resources 310, a quantity of second RAT resource 315, a quantity of shared resources 510 and a quantity of first RAT PSFCH resource 320 to include in the set of available resources 505-b based on the penetration ratio.

The penetration ratio of 0.625, which may correspond to the set of available resources 505-a, may indicate that a geographic area for the UE 115 includes more UEs 115 that communicate using the first RAT than UEs 115 that communicate using the second RAT. Accordingly, the UE 115 may configure the set of available resources 505-a to include a relatively large number of resources associated with the first RAT when compared to a set of available resources 505 associated with a lower penetration ratio of UEs 115 that communicate using the first RAT. For example, the set of available resources 505-a, which corresponds to a penetration ratio of 0.625, may include more first RAT resources 310 than the set of available resources 505-b, which corresponds to a penetration ratio of 0.562.

As described herein, the phrase "penetration ratio" may be understood to refer to a penetration ratio of UEs 115 that communicate using the first RAT. For example, the term "penetration ratio" may be used to describe a quantity of UEs 115 that communicate using the first RAT relative to a quantity of UEs 115 that communicate using the second RAT. That is, a relatively high penetration ratio may correspond to a geographic area including more UEs that communicate using the first RAT than UEs that communicate using the second RAT.

In some cases, the UE 115 may determine that one or more resources should be reserved for the second RAT based on receiving an indication of a synchronization offset indicator for synchronization resources associated with the second RAT. For example, the UE 115 may include a node associated with the second RAT, such as a hardware component capable of communicating using the second RAT. The node may indicate the synchronization offset, and the UE 115 may determine that one or more resources included in the set of available resources 505 should be allocated for the second RAT based on the indication. In some other cases, the UE 115 may receive the indication of the synchronization offset from a wireless device, such as another UE 115, or a network entity (e.g., a network entity 105 as described with reference to FIGS. 1 and 2).

In some other cases, the UE 115 may determine that one or more resources should be reserved for the second RAT based on a configuration at the UE 115 (e.g., a default setting, a preconfigured setting, a default operating mode, a (pre)configuration). For example, the UE 115 may be configured with the synchronization offset indicator for resources associated with the second RAT. In some cases, the network entity 105 may configure the UE 115 with the synchronization offset indicator. The UE 115 may receive the synchronization offset indicator as part of the configuration and may determine that one or more resources included in the set of available resources 505 should be allocated for the second RAT based on the indication.

In some other cases, the UE 115 may detect a transmission associated with the second RAT and may determine that one or more resources associated with the transmission should be reserved for the second RAT. For example, a UE 115 that communicates using the first RAT may receive a PSBCH transmission, such as an S-SSB, from another UE 115 that communicates using a second RAT. Based on receiving the transmission associated with the second RAT, the UE 115 may determine to that one or more resources associated with the transmission should be set aside for the second RAT. As shown by the set of available resources 505-a, the UE 115 may detect an S-SSB from the second RAT. The detected S-SSB may overlap with a first RAT resource 310. Accordingly, the UE 115 may determine to reserve one or more resources for the second RAT. The one or more reserved resources for the second RAT may correspond to a location of the detected transmission associated with the second RAT. For example, the UE 115 may reserve one or more subsequent resources for the second RAT based at least in part on the location of the detected transmission. In some cases, the UE 115 may determine to update the set of available resources 505 based on detecting a transmission associated with the second RAT and may refrain from updating the set of available resources 505 based on other parameters (e.g., to conserve processing power and communication resources associated with updating the set of available resources 505).

The UE 115 may update the set of available resources 505-a to include one or more resources for the second RAT. The set of available resources 505-b may be an example of an updated set of available resources 505-a. In such cases, the UE 115 may determine to update the set of available resources 505-a based on detecting a transmission associated with the second RAT, a configuration, an indication of a synchronization offset indicator, or any combination thereof. The UE 115 may configure the set of available resources 505-b to include one or more second RAT resources 315. For example, the UE 115 may configure the set of available resources 505-b to include a second RAT resource 315 instead of a first RAT resource 310. Accordingly, the set of available resources 505-b may correspond to a penetration ratio of 0.562. The penetration ratio corresponding to the set of available resources 505-b may be calculated based on the update to the set of available resources 505-b.

The UE 115 may update the set of available resources 505-a by shifting one or more resources included in the set of available resources 505-a. For example, the UE 115 may configure the set of available resources 505-c by shifting one or more resources included in the set of available resources 505-a. In some cases, the UE 115 may not shift one or more first RAT PSFCH resources 320. For example, the UE 115 may configure the set of available resources 505-c by shifting the first RAT resources 310, the second RAT resources 315, and the shared resources 510 included in the set of available resources 505-a by one TTI. In such cases, the UE 115 may configure the set of available resources 505-c so that one or more second RAT resources 315 overlap with one or more transmissions associated with the second RAT (e.g., S-SSB transmissions associated with the second RAT). Additionally, or alternatively, a penetration ratio associated with the set of available resources 505-c may be a same penetration ratio as the penetration ratio associated with the set of available resources 505-a.

The UE 115 may update a set of available resources 505 so that the set of available resources 505 is proportional to a penetration ratio. For example, the UE 115 may update the set of available resources 505 based on a table, algorithm, or a formula. In such cases, the UE 115 may determine a resource shift or a quantity of resources based on the table or the formula. In some cases, the UE 115 may update the set of available resources 505 based on one or more rules associated with a resource type. For example, a UE 115 may determine to shift a first RAT resource 310 and may determine not to shift a first RAT PSFCH resource 320.

The UE 115 may transmit an indication of an update to a set of available resources 505 to another wireless device (e.g., another UE 115, a network entity, or the like). The UE 115 may transmit the indication of the update in a medium access control-control element (MAC-CE). The MAC-CE may include an indication of one or more synchronization signal occasions associated with the second RAT, an indication of an update to the set of available resources 505, or both. In some cases, the UE 115-a may determine to transmit the indication based on an RSRP of a synchronization signal associated with the second RAT. For example, the UE 115 that communicates using the first RAT may receive an LTE S-SSB from the UE 115 that communicates using the second RAT and determine to transmit an indication of the update to the set of available resources 505 if the LTE S-SSB has an RSRP that is above a threshold RSRP.

Figure 6:
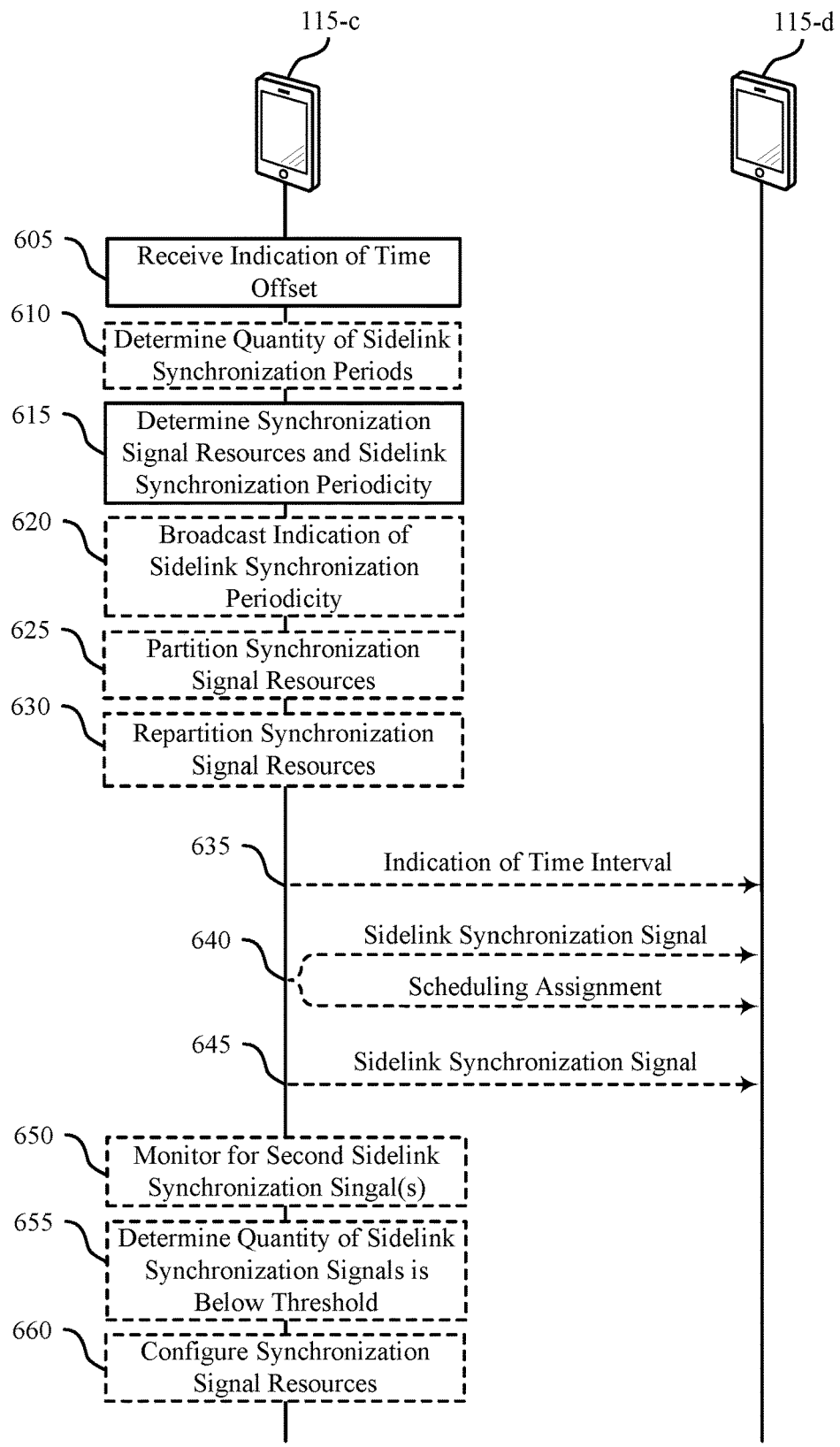
FIG. 6 illustrates an example of a process flow that supports resource sharing between sidelink devices using different RATs in accordance with one or more aspects of the present disclosure.

FIG. 6 illustrates an example of a process flow 600 that supports resource sharing between sidelink devices using different RATs in accordance with one or more aspects of the present disclosure. In some cases, the process flow 600 may implement aspects of the wireless communications system 100 and the wireless communications system 200. For example, the process flow 600 may include a UE 115-c and a UE 115-d, which may be examples of UEs 115 as described with reference to FIGS. 1 and 2. In some cases, process flow 600 may implement aspects of the resource configurations 300, 400, and 500. For example, the UE 115-c, the UE 115-d, or both may implement one or more resource configurations for transmitting sidelink communications using different RATs.

In the following description of process flow 600, the operations between the UE 115-c and the UE 115-d may be transmitted in a different order than the order shown, or the operations may be performed at different times. Some operations may also be left out of process flow 600, or other operations may be added to process flow 600. While the UEs 115 are shown performing a number of the operations of process flow 600, any wireless device may perform the operations shown.

At 605, the UE 115-c may receive an indication of a time offset for a set of synchronization signal resources for one or more sidelink synchronization signals for a first RAT. For example, the UE 115-c may receive an indication of a time offset variable for a 5G NR S-SSB. In some cases, the UE 115-c may receive the indication of the time offset from the UE 115-d. In some other cases, the UE 115-c may receive the indication of the time offset from a network entity 105, which may be an example of a network entity 105 as described with reference to FIGS. 1 and 2. The time offset may be for a first time resource for a synchronization signal. In some cases, the time offset may indicate a duration between one or more time resources.

At 610, the UE 115-c may determine a quantity of the one or more sidelink synchronization periods according to an integer multiple, where a first set of time resources, a second set of time resources, and the set of synchronization signal resources are based on the quantity of the one or more sidelink synchronization periods. In some cases, the UE 115-c may configure one or more resources for the quantity of the one or more synchronization periods. Additionally, or alternatively, the quantity of the one or more sidelink synchronization periods may correspond to a sidelink synchronization periodicity.

At 615, the UE 115-c may determine the set of synchronization signal resources and a sidelink synchronization periodicity at the UE 115-c based on the indication of the time offset and a percentage of UEs 115 using the first RAT within a geographic area. In some cases, determining the set of synchronization signal resources may include partitioning, for each sidelink synchronization period of one or more sidelink synchronization periods, a first set of time resources for first communications for the first RAT. In some cases, the UE 115-c may partition the one or more sidelink synchronization resources for a sidelink synchronization signal periodicity. Additionally, or alternatively, the UE 115-c may partition a second set of time resources for second communications for a second RAT. The UE 115-c may also partition the set of synchronization signal resources for the one or more sidelink synchronization signals. The one or more sidelink synchronization signal periods may include the first set of time resources, the second set of time resources, and the set of synchronization signal resources.

In some cases, determining the sidelink synchronization periodicity may include receiving one or more indications of one or more additional sidelink synchronization periodicities and updating the sidelink synchronization periodicity based on the one or more additional sidelink synchronization periodicities being greater than the sidelink synchronization periodicity, an RSRP for the indication being greater than a threshold RSRP, or both. In some examples, the UE 115-c may selectively transmit the one or more sidelink synchronization signals in accordance with the percentage of UEs 115 for the first RAT. In some cases, the percentage of UEs 115 for the first RAT within the geographic area further includes a ratio of a first quantity of UEs 115 for the first RAT within the geographic area to a sum of the first quantity of UEs 115 and a second quantity of UEs 115 for a second RAT within the geographic area.

At 620, the UE 115-c may broadcast an indication of the sidelink synchronization periodicity based on determining the sidelink synchronization periodicity at the UE 115-c. For example, the UE 115-c may transmit one or more PSBCH messages including the indication of the sidelink synchronization periodicity. In some cases, the UE 115-d may receive the indication of the sidelink synchronization periodicity. The UE 115-d may perform one or more operations to establish a sidelink connection with the UE 115-d based on receiving the indication of the sidelink synchronization periodicity from the UE 115-c.

At 625, the UE 115-c may partition the set of synchronization signal resources for one or more second sidelink synchronization signals for a second RAT in accordance with the determining. For example, the UE 115-c may determine to configure a set of available resources that includes one or more resources for sidelink synchronization signals for the second RAT. In some cases, the UE 115-c may reserve one or more resources for receiving S-SSBs for the second RAT. For example, the UE 115-d may communicate using the second RAT and may transmit one or more S-SSBs, which may be received by the UE 115-c.

At 630, the UE 115-c may repartition the set of synchronization signal resources based on shifting a first portion of the set of synchronization signal resources by a time interval, where the at least one of the set of synchronization signal resources comprise the first portion of the set of synchronization signal resources. In some cases, the time interval may correspond to a resource shift, which may enable the UE 115-c to align one or more resources for the second RAT with one or more synchronization signal transmissions for the second RAT.

At 635, the UE 115-c may transmit an indication of the time interval, one or more time resources for which the UE 115-c performs the repartitioning, or both in system information. In some cases, the UE 115-d may receive the indication of the time interval, one or more time resources for which the UE 115-c performs the repartitioning, or both. The UE 115-d may receive the indication and determine to transmit one or more sidelink synchronization signals based on receiving the indication. In some other cases, the UE 115-d may receive the indication of the time interval and update one or more resources at the UE 115-d based on receiving the indication.

At 640, the UE 115-c may transmit, at a first time interval, one or more SAs for scheduling a set of communication resources for a second RAT, the one or more SAs reserving the at least one of the set of synchronization signal resources for the one or more sidelink synchronization signals. In some cases, selectively transmitting the one or more sidelink synchronization signals may further include transmitting the one or more sidelink synchronization signals based on transmitting the one or more SAs. For example, the UE 115-c may transmit the one or more SAs and the one or more sidelink synchronization signals simultaneously.

At 645, the UE 115-c may selectively transmit the one or more sidelink synchronization signals on at least one of the set of synchronization signal resources and according to the sidelink synchronization periodicity. In some cases, selectively transmitting the one or more sidelink synchronization signals includes partitioning the set of synchronization signal resources for the one or more sidelink synchronization signals in accordance with the determining and transmitting the one or more sidelink synchronization signals based on the partitioning. In some cases, selectively transmitting the one or more sidelink synchronization signals may include refraining from transmitting the one or more sidelink synchronization signals based on a priority of the one or more second sidelink synchronization signals being greater than a priority of the one or more sidelink synchronization signals. In some cases, selectively transmitting the one or more sidelink synchronization signals may include transmitting the one or more sidelink synchronization signals on the at least one of the set of synchronization signal resources.

At 650, the UE 115-c may monitor for one or more second sidelink synchronization signals. For example, the UE 115-c may monitor for one or more second sidelink synchronization signals from the UE 115-d. Monitoring for the one or more second sidelink synchronization signals may include monitoring a PSBCH for the one or more second sidelink synchronization signals. In some cases, the UE 115-c may monitor for the one or more second sidelink synchronization signals and receive one or more second sidelink synchronization signals from the UE 115-d.

At 655, the UE 115-c may determine, based on the monitoring, that a quantity of the one or more second sidelink synchronization signals received at the UE 115-c is below a threshold. In some cases, the UE 115-c may determine, based on the monitoring, that the quantity of the one or more second sidelink synchronization signals is below a threshold quantity. The UE 115-c may determine the threshold based on a priority for one or more RATs. For example, a priority for 5G NR communications may be higher than a priority for LTE communications.

At 660, the UE 115-c may configure the set of synchronization signal resources for sidelink shared channel signaling, sidelink feedback channel signaling, or both based on determining that a quantity of received sidelink synchronization signals are below a threshold quantity. In some cases, the UE 115-c may dynamically configure the set of synchronization signal resources and the sidelink synchronization periodicity according to a dynamic resource pool partition frame structure. In some cases, the first RAT may include 5G NR and the second RAT may include LTE.

Figure 7:
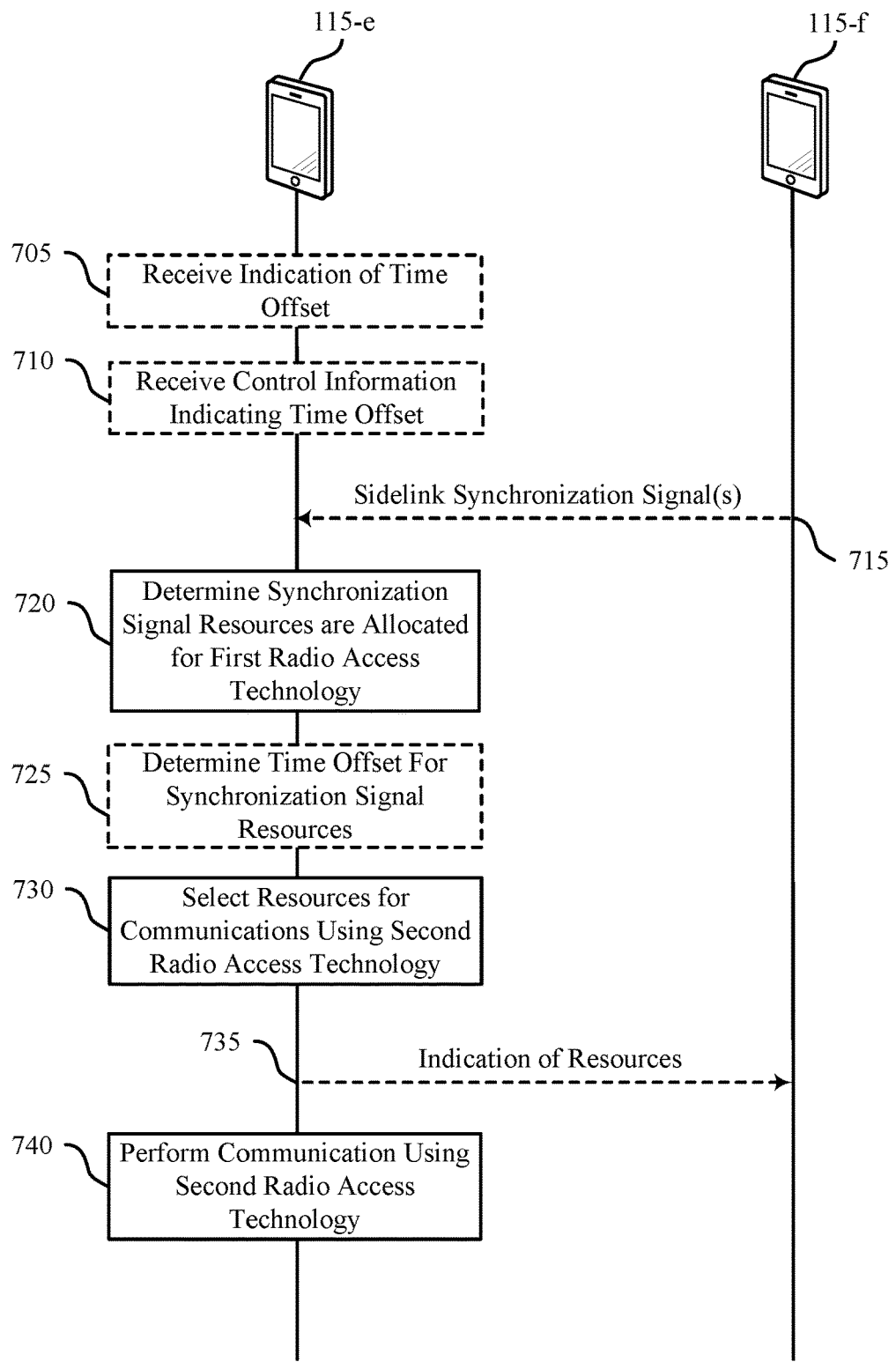
FIG. 7 illustrates an example of a process flow that supports resource sharing between sidelink devices using different RATs in accordance with one or more aspects of the present disclosure.

FIG. 7 illustrates an example of a process flow 700 that supports resource sharing between sidelink devices using different RATs in accordance with one or more aspects of the present disclosure. In some cases, the process flow 700 may implement aspects of the wireless communications system 100 and the wireless communications system 200. For example, the process flow 700 may include a UE 115-e and a UE 115-f, which may be examples of UEs 115 as described with reference to FIGS. 1 and 2. In some cases, process flow 700 may implement aspects of the resource configurations 300, 400, and 500. For example, the UE 115-e, the UE 115-f, or both may implement one or more resource configurations for transmitting sidelink communications using different RATs.

In the following description of process flow 700, the operations between the UE 115-e and the UE 115-f may be transmitted in a different order than the order shown, or the operations may be performed at different times. Some operations may also be left out of process flow 700, or other operations may be added to process flow 700. While the UEs 115 are shown performing a number of the operations of process flow 700, any wireless device may perform the operations shown.

At 705, the UE 115-e may receive from a co-located node for the first RAT, an indication of a time offset for the set of synchronization signal resources, where selecting the set of resources for the communications for the second RAT is based on the indication. The co-located node may be an LTE node, such as an LTE modem or any other hardware capable of performing communications using LTE. In some other cases, the UE 115-e may receive the indication of the time offset from an LTE device, such as the UE 115-f.

At 710, the UE 115-e may receive control information indicating a time offset for the set of synchronization signal resources, where selecting the set of resources for the communications for the second RAT is based on the time offset. For example, the UE 115-e may receive an indication of a time offset variable for an S-SSB. In some cases, the UE 115-e may receive the indication of the time offset from the UE 115-f. In some other cases, the UE 115-e may receive the indication of the time offset from a network entity 105. The time offset may be for a first time resources for a synchronization signal. In some cases, the time offset may indicate a duration between one or more time resources.

At 715, the UE 115-e may receive, from the UE 115-f, the one or more sidelink synchronization signals for the first RAT. For example, the UE 115-f may transmit an LTE S-SSB over a PSBCH. The UE 115-e may receive the LTE S-SSB over the PSBCH. In some cases, the one or more sidelink synchronization signals may overlap with one or more resources for the first RAT. In some other cases, the one or more sidelink synchronization signals may overlap with one or more resources for the second RAT.

At 720, the UE 115-e may determine that a set of synchronization signal resources are allocated for one or more sidelink synchronization signals for a first RAT. For example, the UE 115-e may determine that the set of synchronization signal resources are allocated for one or more sidelink synchronization signals for the first RAT based on receiving the one or more sidelink synchronization signals for the first RAT. In some other cases, the UE 115-e may determine that the set of synchronization signal resources are allocated for one or more sidelink synchronization signals based on a configuration or based on receiving an indication from a network entity 105 or the UE 115-f.

At 725, the UE 115-e may determine a time offset for the set of synchronization signal resources, where selecting the set of resources for the communications for the second RAT is based on determining the time offset. For example, the UE 115-e may determine the time offset for the set of synchronization signal resources based on receiving one or more sidelink synchronization signals from the UE 115-f. In some other cases, the UE 115-e may determine the time offset for the set of synchronization signal resources based on a configuration or based on receiving an indication from a network entity 105 or the UE 115-f.

At 730, the UE 115-e may select a set of resources for communications for a second RAT based on determining that the set of synchronization signal resources are allocated, the set of resources being different from the set of synchronization signal resources. In some cases, selecting the set of resources for the communications for the second RAT may include allocating a resource of the set of resources for communications for the second RAT as a synchronization signal resource for the one or more sidelink synchronization signals for the first RAT.

In some cases, selecting the set of resources for the communications for the second RAT may include determining a percentage of UEs 115 within a geographic area for the second RAT and allocating the set of resources for the communications for the second RAT based on the percentage. In some cases, selecting the set of resources for the communications for the second RAT may include shifting the set of resources for communications for the second RAT by a quantity of time intervals.

At 735, the UE 115-e may transmit an indication of the selected set of resources for the communications for the second RAT based on an RSRP of the one or more sidelink synchronization signals being below a threshold. For example, the UE 115-*e* may transmit an indication of the selected set of resources to the UE 115-*f*. The UE 115-*e* may transmit the indication of the selected set of resources over a PSBCH. In some cases, the UE 115-*f* may receive the indication and determine transmit one or more sidelink synchronization signals based on the indication. In some other cases, the UE 115-*f* may receive the indication and determine to update one or more resource configurations at the UE 115-*f* based on the indication.

At 740, the UE 115-*e* may perform the communications for the second RAT on the set of resources based on selecting the set of resources. For example, the UE 115-*e* may transmit one or more sidelink synchronization signals for the second RAT on the set of resources. In some cases, the UE 115-*e* may broadcast one or more sidelink synchronization signals over a PSBCH and the one or more sidelink synchronization signals may be received by the UE 115-*f*. In some cases, the first RAT may be LTE and the second RAT may be 5G NR.

Figure 8:
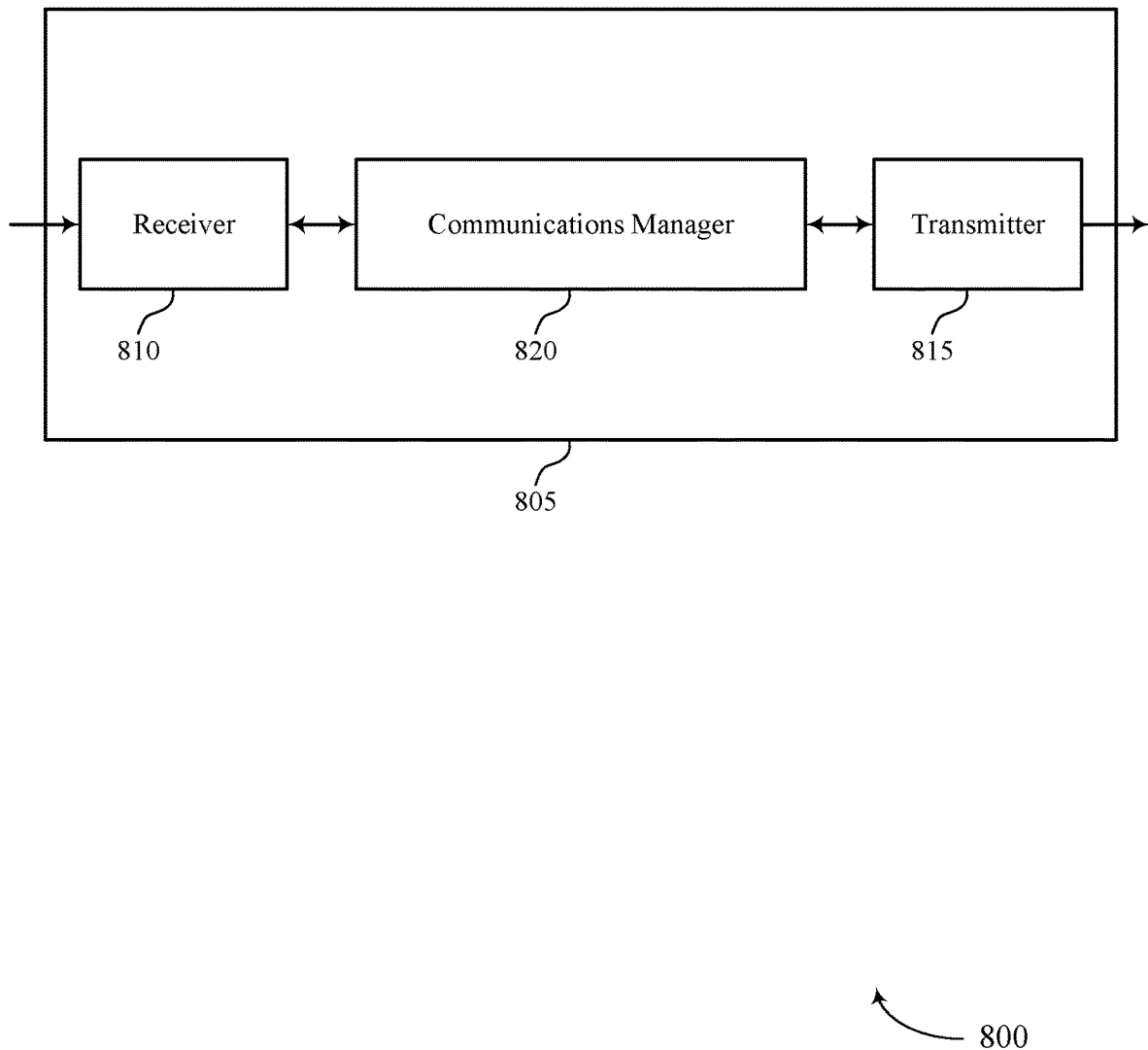
FIGS. 8 and 9 show block diagrams of devices that support resource sharing between sidelink devices using different RATs in accordance with one or more aspects of the present disclosure.

FIG. 8 shows a block diagram 800 of a device 805 that supports resource sharing between sidelink devices using different RATs in accordance with one or more aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to resource sharing between sidelink devices using different RATs). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to resource sharing between sidelink devices using different RATs). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of resource sharing between sidelink devices using different RATs as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a UE in accordance with examples as disclosed herein. For example, the communications manager 820 may be configured as or otherwise support a means for receiving, an indication of a time offset for a set of multiple synchronization signal resources for one or more sidelink synchronization signals associated with a first RAT. The communications manager 820 may be configured as or otherwise support a means for determining the set of multiple synchronization signal resources and a sidelink synchronization periodicity at the UE based on the indication of the time offset and a percentage of UEs associated with the first RAT within a geographic area. The communications manager 820 may be configured as or otherwise support a means for selectively transmitting the one or more sidelink synchronization signals on at least one of the set of multiple synchronization signal resources and according to the sidelink synchronization periodicity.

Additionally, or alternatively, the communications manager 820 may support wireless communications at a first UE in accordance with examples as disclosed herein. For example, the communications manager 820 may be configured as or otherwise support a means for determining that a set of multiple synchronization signal resources are allocated for one or more sidelink synchronization signals associated with a first RAT. The communications manager 820 may be configured as or otherwise support a means for selecting a set of multiple resources for communications associated with a second RAT based on determining that the set of multiple synchronization signal resources are allocated, the set of multiple resources being different from the set of multiple synchronization signal resources. The communications manager 820 may be configured as or otherwise support a means for performing the communications associated with the second RAT on the set of multiple resources based on selecting the set of multiple resources.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for effective utilization of communication resources and improved coordination between sidelink devices. For example, the device 805 may support improved coordination between sidelink devices by configuring a set of available resources that includes resources for sidelink synchronization signals. Additionally, or alternatively, the device 805 may configure the set of available resources to include resources for multiple UEs 115 that communicate using different RATs. Accordingly, interference between UEs 115 that communicate using different RATs may be reduced or eliminated.

Figure 9:
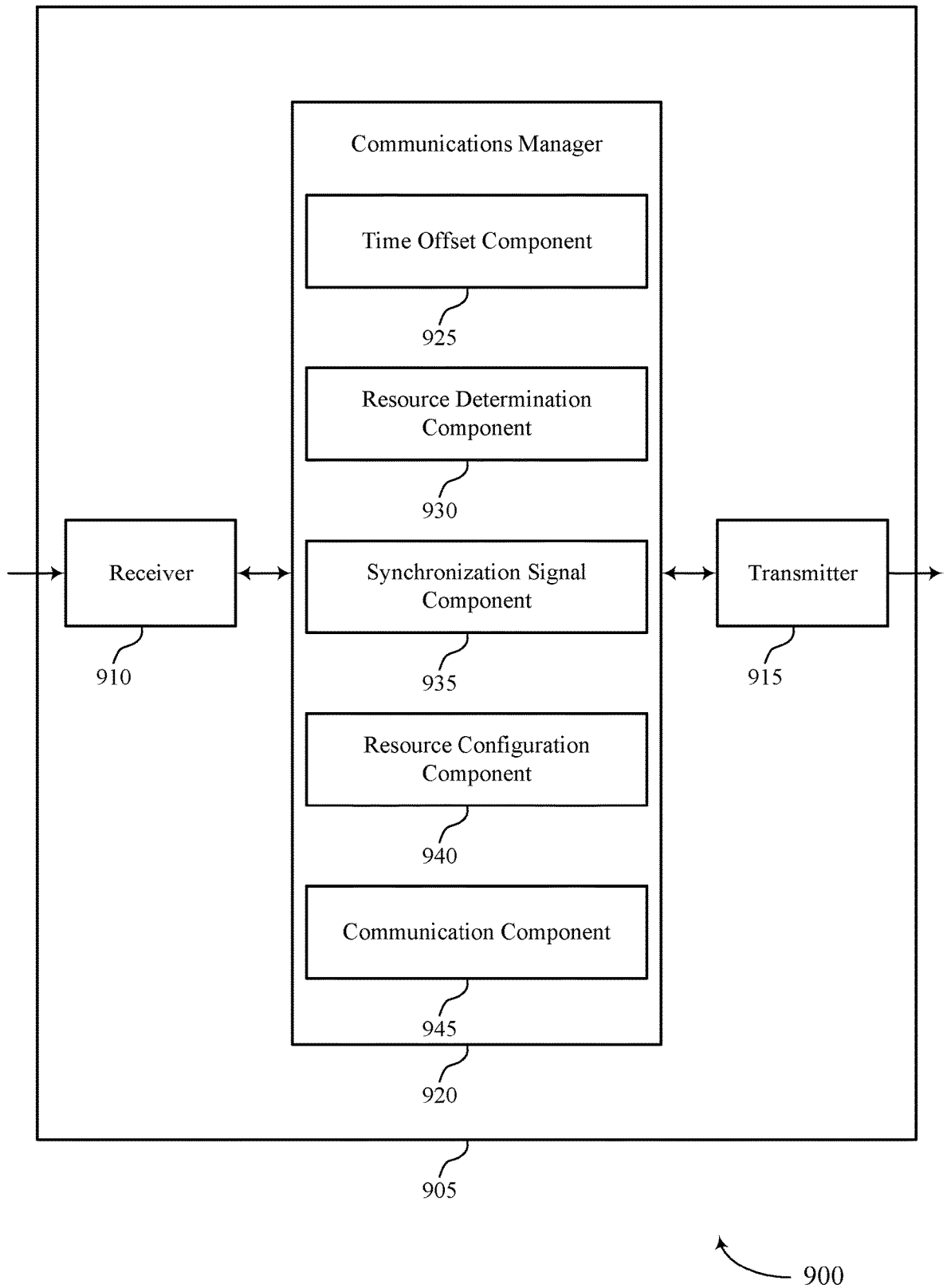

FIG. 9 shows a block diagram 900 of a device 905 that supports resource sharing between sidelink devices using different RATs in accordance with one or more aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to resource sharing between sidelink devices using different RATs). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to resource sharing between sidelink devices using different RATs). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of resource sharing between sidelink devices using different RATs as described herein. For example, the communications manager 920 may include a time offset component 925, a resource determination component 930, a synchronization signal component 935, a resource configuration component 940, a communication component 945, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a UE in accordance with examples as disclosed herein. The time offset component 925 may be configured as or otherwise support a means for receiving, an indication of a time offset for a set of multiple synchronization signal resources for one or more sidelink synchronization signals associated with a first RAT. The resource determination component 930 may be configured as or otherwise support a means for determining the set of multiple synchronization signal resources and a sidelink synchronization periodicity at the UE based on the indication of the time offset and a percentage of UEs associated with the first RAT within a geographic area. The synchronization signal component 935 may be configured as or otherwise support a means for selectively transmitting the one or more sidelink synchronization signals on at least one of the set of multiple synchronization signal resources and according to the sidelink synchronization periodicity.

Additionally, or alternatively, the communications manager 920 may support wireless communications at a first UE in accordance with examples as disclosed herein. The resource determination component 930 may be configured as or otherwise support a means for determining that a set of multiple synchronization signal resources are allocated for one or more sidelink synchronization signals associated with a first RAT. The resource configuration component 940 may be configured as or otherwise support a means for selecting a set of multiple resources for communications associated with a second RAT based on determining that the set of multiple synchronization signal resources are allocated, the set of multiple resources being different from the set of multiple synchronization signal resources. The communication component 945 may be configured as or otherwise support a means for performing the communications associated with the second RAT on the set of multiple resources based on selecting the set of multiple resources.

Figure 10:
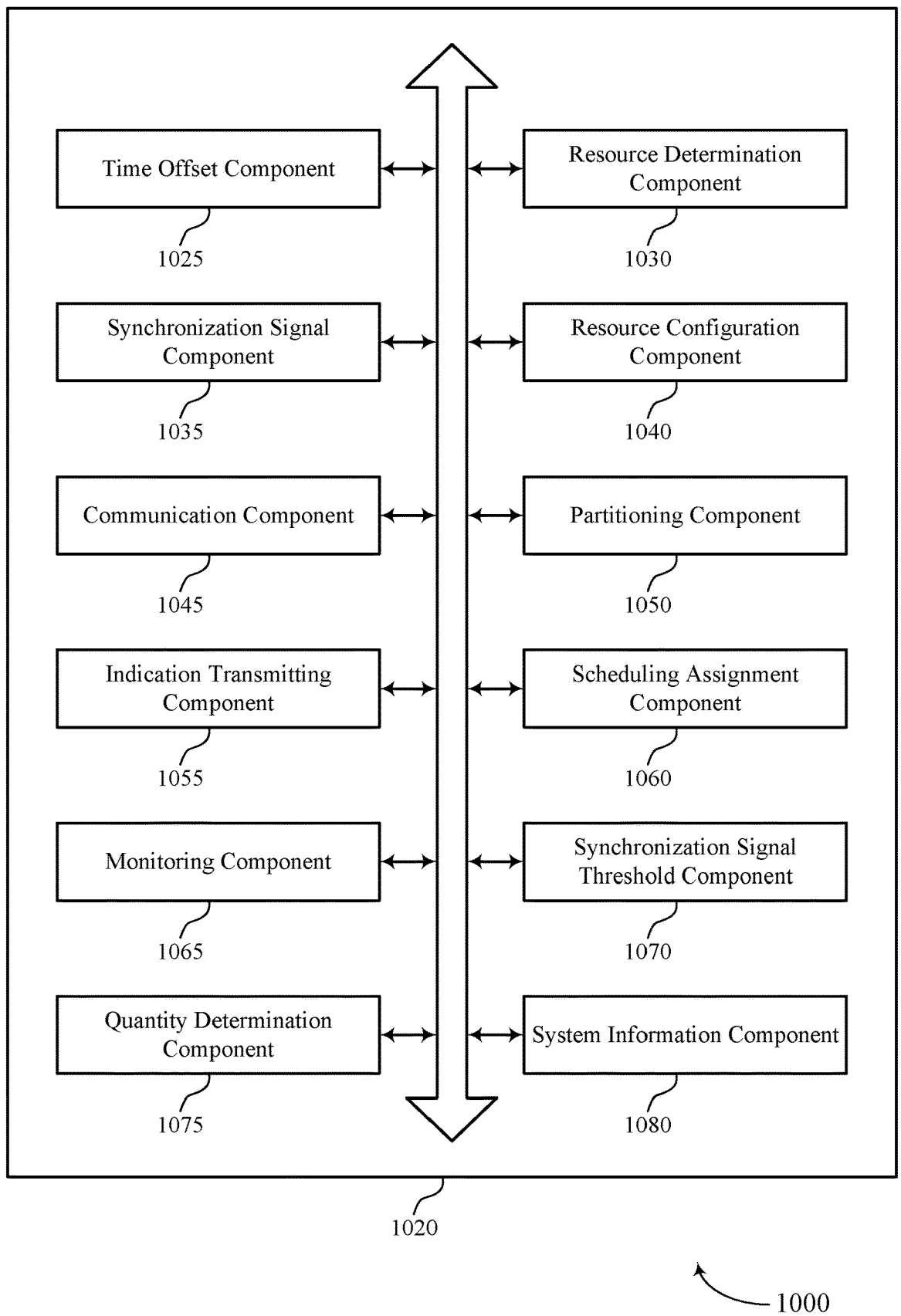
FIG. 10 shows a block diagram of a communications manager that supports resource sharing between sidelink devices using different RATs in accordance with one or more aspects of the present disclosure.

FIG. 10 shows a block diagram 1000 of a communications manager 1020 that supports resource sharing between sidelink devices using different RATs in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of resource sharing between sidelink devices using different RATs as described herein. For example, the communications manager 1020 may include a time offset component 1025, a resource determination component 1030, a synchronization signal component 1035, a resource configuration component 1040, a communication component 1045, a partitioning component 1050, an indication transmitting component 1055, a scheduling assignment component 1060, a monitoring component 1065, a synchronization signal threshold component 1070, a quantity determination component 1075, a system information component 1080, or any combination thereof. Each of these components may communicate, directly or indirectly, with one another (e.g., via one or more buses).

The communications manager 1020 may support wireless communications at a UE in accordance with examples as disclosed herein. The time offset component 1025 may be configured as or otherwise support a means for receiving, an indication of a time offset for a set of multiple synchronization signal resources for one or more sidelink synchronization signals associated with a first RAT. The resource determination component 1030 may be configured as or otherwise support a means for determining the set of multiple synchronization signal resources and a sidelink synchronization periodicity at the UE based on the indication of the time offset and a percentage of UEs associated with the first RAT within a geographic area. The synchronization signal component 1035 may be configured as or otherwise support a means for selectively transmitting the one or more sidelink synchronization signals on at least one of the set of multiple synchronization signal resources and according to the sidelink synchronization periodicity.

In some examples, to support determining the set of multiple synchronization signal resources, the resource determination component 1030 may be configured as or otherwise support a means for partitioning, for each sidelink synchronization period of one or more sidelink synchronization periods, a first set of multiple time resources for first communications associated with the first RAT, where one or more sidelink synchronization signal periods are associated with the sidelink synchronization periodicity. In some examples, to support determining the set of multiple synchronization signal resources, the resource determination component 1030 may be configured as or otherwise support a means for partitioning, for the each sidelink synchronization period of the one or more sidelink synchronization periods, a second set of multiple time resources for second communications associated with a second RAT. In some examples, to support determining the set of multiple synchronization signal resources, the resource determination component 1030 may be configured as or otherwise support a means for partitioning, for the each sidelink synchronization period of the one or more sidelink synchronization periods, the set of multiple synchronization signal resources for the one or more sidelink synchronization signals, where the one or more sidelink synchronization signal periods include the first set of multiple time resources, the second set of multiple time resources, and the set of multiple synchronization signal resources.

In some examples, the quantity determination component 1075 may be configured as or otherwise support a means for determining a quantity of the one or more sidelink synchronization periods according to an integer multiple, where the first set of multiple time resources, the second set of multiple time resources, and the set of multiple synchronization signal resources are based on the quantity of the one or more sidelink synchronization periods.

In some examples, to support selectively transmitting the one or more sidelink synchronization signals, the synchronization signal component 1035 may be configured as or otherwise support a means for partitioning the set of multiple synchronization signal resources for the one or more sidelink synchronization signals in accordance with the determining. In some examples, to support selectively transmitting the one or more sidelink synchronization signals, the synchronization signal component 1035 may be configured as or otherwise support a means for transmitting the one or more sidelink synchronization signals based on the partitioning.

In some examples, the partitioning component 1050 may be configured as or otherwise support a means for partitioning the set of multiple synchronization signal resources for one or more second sidelink synchronization signals associated with a second RAT in accordance with the determining.

In some examples, to support selectively transmitting the one or more sidelink synchronization signals, the synchronization signal component 1035 may be configured as or otherwise support a means for refraining from transmitting the one or more sidelink synchronization signals based on a priority of the one or more second sidelink synchronization signals being greater than a priority of the one or more sidelink synchronization signals.

In some examples, to support selectively transmitting the one or more sidelink synchronization signals, the synchronization signal component 1035 may be configured as or otherwise support a means for transmitting the one or more sidelink synchronization signals on the at least one of the set of multiple synchronization signal resources.

In some examples, the partitioning component 1050 may be configured as or otherwise support a means for repartitioning the set of multiple synchronization signal resources based on shifting a first portion of the set of multiple synchronization signal resources by a time interval, where the at least one of the set of multiple synchronization signal resources include the first portion of the set of multiple synchronization signal resources.

In some examples, the system information component 1080 may be configured as or otherwise support a means for transmitting an indication of the time interval, one or more time resources for which the UE performs the repartitioning, or both in system information.

In some examples, to support determining the sidelink synchronization periodicity, the resource determination component 1030 may be configured as or otherwise support a means for receiving one or more indications of one or more additional sidelink synchronization periodicities. In some examples, to support determining the sidelink synchronization periodicity, the resource determination component 1030 may be configured as or otherwise support a means for updating the sidelink synchronization periodicity based on the one or more additional sidelink synchronization periodicities being greater than the sidelink synchronization periodicity, an RSRP associated with the indication being greater than a threshold RSRP, or both.

In some examples, the indication transmitting component 1055 may be configured as or otherwise support a means for broadcasting an indication of the sidelink synchronization periodicity based on determining the sidelink synchronization periodicity at the UE.

In some examples, the scheduling assignment component 1060 may be configured as or otherwise support a means for transmitting, at a first time interval, one or more scheduling assignments for scheduling a set of multiple communication resources for a second RAT, the one or more scheduling assignments reserving the at least one of the set of multiple synchronization signal resources for the one or more sidelink synchronization signals.

In some examples, to support selectively transmitting the one or more sidelink synchronization signals, the synchronization signal component 1035 may be configured as or otherwise support a means for transmitting, at a second time interval after the first time interval and in accordance with the sidelink synchronization periodicity, the one or more sidelink synchronization signals based on transmitting the one or more scheduling assignments.

In some examples, the first RAT includes 5G NR and the second RAT includes LTE.

In some examples, to support selectively transmitting the one or more sidelink synchronization signals, the synchronization signal component 1035 may be configured as or otherwise support a means for transmitting, at the first time interval, the one or more sidelink synchronization signals based on transmitting the one or more scheduling assignments.

In some examples, the monitoring component 1065 may be configured as or otherwise support a means for monitoring for one or more second sidelink synchronization signals. In some examples, the synchronization signal threshold component 1070 may be configured as or otherwise support a means for determining, based on the monitoring, that a quantity of the one or more second sidelink synchronization signals received at the UE is below a threshold. In some examples, the resource configuration component 1040 may be configured as or otherwise support a means for configuring the set of multiple synchronization signal resources for sidelink shared channel signaling, sidelink feedback channel signaling, or both based on determining that a quantity of received sidelink synchronization signals are below a threshold quantity.

In some examples, the resource configuration component 1040 may be configured as or otherwise support a means for configuring the set of multiple synchronization signal resources for sidelink shared channel signaling, sidelink feedback channel signaling, or both based on the sidelink synchronization periodicity being less than a periodicity for transmitting the one or more sidelink synchronization signals.

In some examples, the resource configuration component 1040 may be configured as or otherwise support a means for dynamically configuring the set of multiple synchronization signal resources and the sidelink synchronization periodicity according to a dynamic resource pool partition frame structure.

In some examples, the selectively transmitting the one or more sidelink synchronization signals may be in accordance with the percentage of UEs associated with the first RAT.

In some examples, the percentage of UEs associated with the first RAT within the geographic area further includes a ratio of a first quantity of UEs associated with the first RAT within the geographic area to a sum of the first quantity of UEs and a second quantity of UEs associated with a second RAT within the geographic area.

Additionally, or alternatively, the communications manager 1020 may support wireless communications at a first UE in accordance with examples as disclosed herein. In some examples, the resource determination component 1030 may be configured as or otherwise support a means for determining that a set of multiple synchronization signal resources are allocated for one or more sidelink synchronization signals associated with a first RAT. The resource configuration component 1040 may be configured as or otherwise support a means for selecting a set of multiple resources for communications associated with a second RAT based on determining that the set of multiple synchronization signal resources are allocated, the set of multiple resources being different from the set of multiple synchronization signal resources. The communication component 1045 may be configured as or otherwise support a means for performing the communications associated with the second RAT on the set of multiple resources based on selecting the set of multiple resources.

In some examples, the time offset component 1025 may be configured as or otherwise support a means for receiving, from a co-located node associated with the first RAT, an indication of a time offset for the set of multiple synchronization signal resources, where selecting the set of multiple resources for the communications associated with the second RAT is based on the indication.

In some examples, the time offset component 1025 may be configured as or otherwise support a means for receiving control information indicating a time offset for the set of multiple synchronization signal resources, where selecting the set of multiple resources for the communications associated with the second RAT is based on the time offset.

In some examples, the synchronization signal component 1035 may be configured as or otherwise support a means for receiving, from a second UE, the one or more sidelink synchronization signals associated with the first RAT. In some examples, the time offset component 1025 may be configured as or otherwise support a means for determining a time offset for the set of multiple synchronization signal resources, where selecting the set of multiple resources for the communications associated with the second RAT is based on determining the time offset.

In some examples, to support selecting the set of multiple resources for the communications associated with the second RAT, the resource configuration component 1040 may be configured as or otherwise support a means for allocating a resource of the set of multiple resources for communications associated with the second RAT as a synchronization signal resource for the one or more sidelink synchronization signals associated with the first RAT.

In some examples, to support selecting the set of multiple resources for the communications associated with the second RAT, the resource configuration component 1040 may be configured as or otherwise support a means for determining a percentage of UEs within a geographic area associated with the second RAT. In some examples, to support selecting the set of multiple resources for the communications associated with the second RAT, the resource configuration component 1040 may be configured as or otherwise support a means for allocating the set of multiple resources for the communications associated with the second RAT based on the percentage.

In some examples, to support selecting the set of multiple resources for the communications associated with the second RAT, the resource configuration component 1040 may be configured as or otherwise support a means for shifting the set of multiple resources for communications associated with the second RAT by a quantity of time intervals.

In some examples, the indication transmitting component 1055 may be configured as or otherwise support a means for transmitting an indication of the selected set of multiple resources for the communications associated with the second RAT based on a RSRP of the one or more sidelink synchronization signals being below a threshold.

In some examples, the first RAT includes LTE and the second RAT includes 5G NR.

Figure 11:
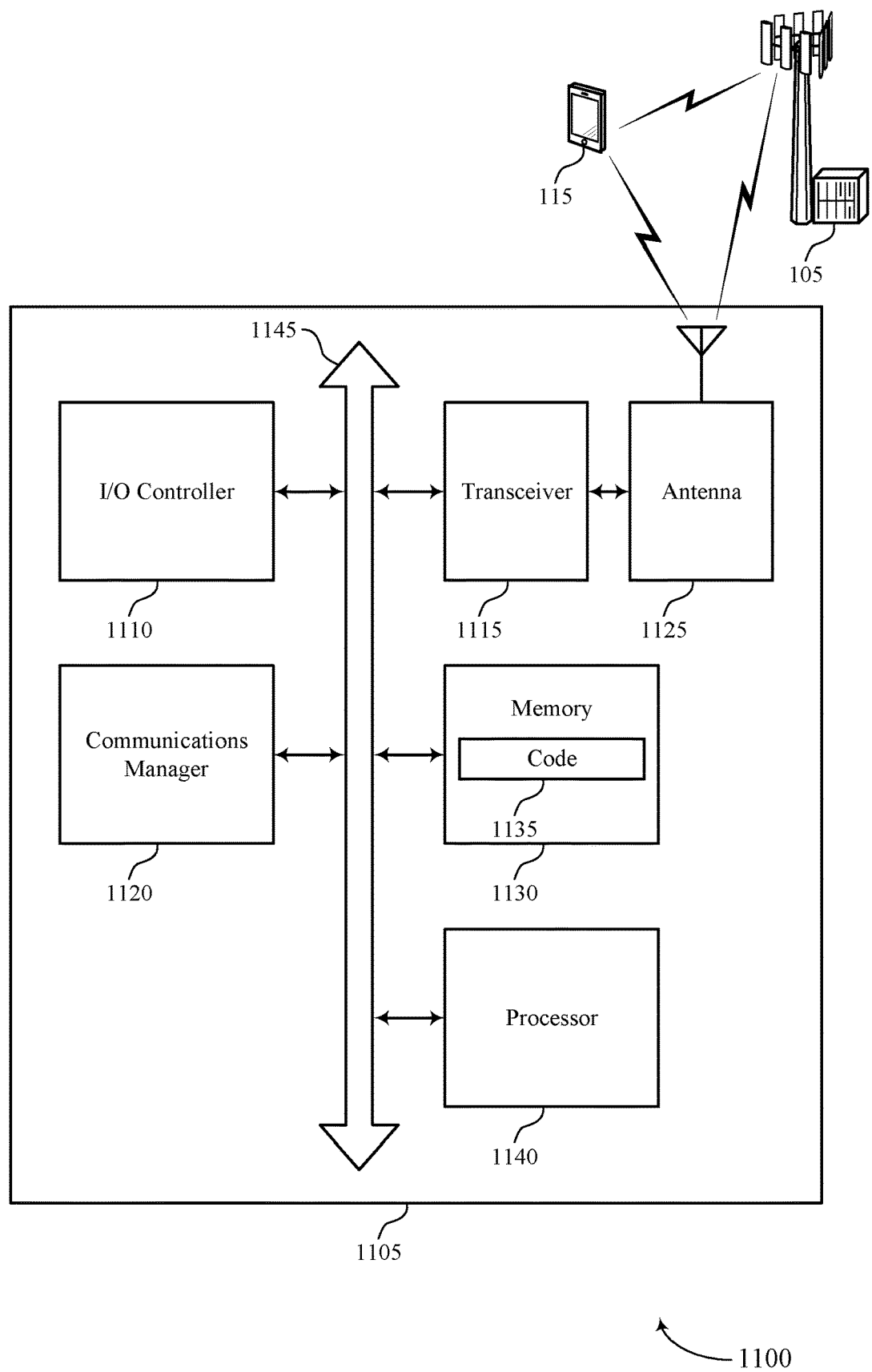
FIG. 11 shows a diagram of a system including a device that supports resource sharing between sidelink devices using different RATs in accordance with one or more aspects of the present disclosure.

FIG. 11 shows a diagram of a system 1100 including a device 1105 that supports resource sharing between sidelink devices using different RATs in accordance with one or more aspects of the present disclosure. The device 1105 may be an example of or include the components of a device 805, a device 905, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting resource sharing between sidelink devices using different RATs). For example, the device 1105 or a component of the device 1105 may include a processor 1140 and memory 1130 coupled with or to the processor 1140, the processor 1140 and memory 1130 configured to perform various functions described herein.

The communications manager 1120 may support wireless communications at a UE in accordance with examples as disclosed herein. For example, the communications manager 1120 may be configured as or otherwise support a means for receiving, an indication of a time offset for a set of multiple synchronization signal resources for one or more sidelink synchronization signals associated with a first RAT. The communications manager 1120 may be configured as or otherwise support a means for determining the set of multiple synchronization signal resources and a sidelink synchronization periodicity at the UE based on the indication of the time offset and a percentage of UEs associated with the first RAT within a geographic area. The communications manager 1120 may be configured as or otherwise support a means for selectively transmitting the one or more sidelink synchronization signals on at least one of the set of multiple synchronization signal resources and according to the sidelink synchronization periodicity.

Additionally, or alternatively, the communications manager 1120 may support wireless communications at a first UE in accordance with examples as disclosed herein. For example, the communications manager 1120 may be configured as or otherwise support a means for determining that a set of multiple synchronization signal resources are allocated for one or more sidelink synchronization signals associated with a first RAT. The communications manager 1120 may be configured as or otherwise support a means for selecting a set of multiple resources for communications associated with a second RAT based on determining that the set of multiple synchronization signal resources are allocated, the set of multiple resources being different from the set of multiple synchronization signal resources. The communications manager 1120 may be configured as or otherwise support a means for performing the communications associated with the second RAT on the set of multiple resources based on selecting the set of multiple resources.

By including or configuring the communications manager 1120 in accordance with examples as described herein, the device 1105 may support techniques for improved communication reliability between sidelink devices. For example, the device 1105 may support improved coordination between sidelink devices by configuring a set of available resources that includes resources for sidelink synchronization signals. Additionally, or alternatively, the device 1105 may configure the set of available resources to include resources for multiple UEs 115 that communicate using different RATs. Accordingly, interference between UEs 115 that communicate using different RATs may be reduced or eliminated.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of resource sharing between sidelink devices using different RATs as described herein, or the processor 1140 and the memory 1130 may be otherwise configured to perform or support such operations.

Figure 12:
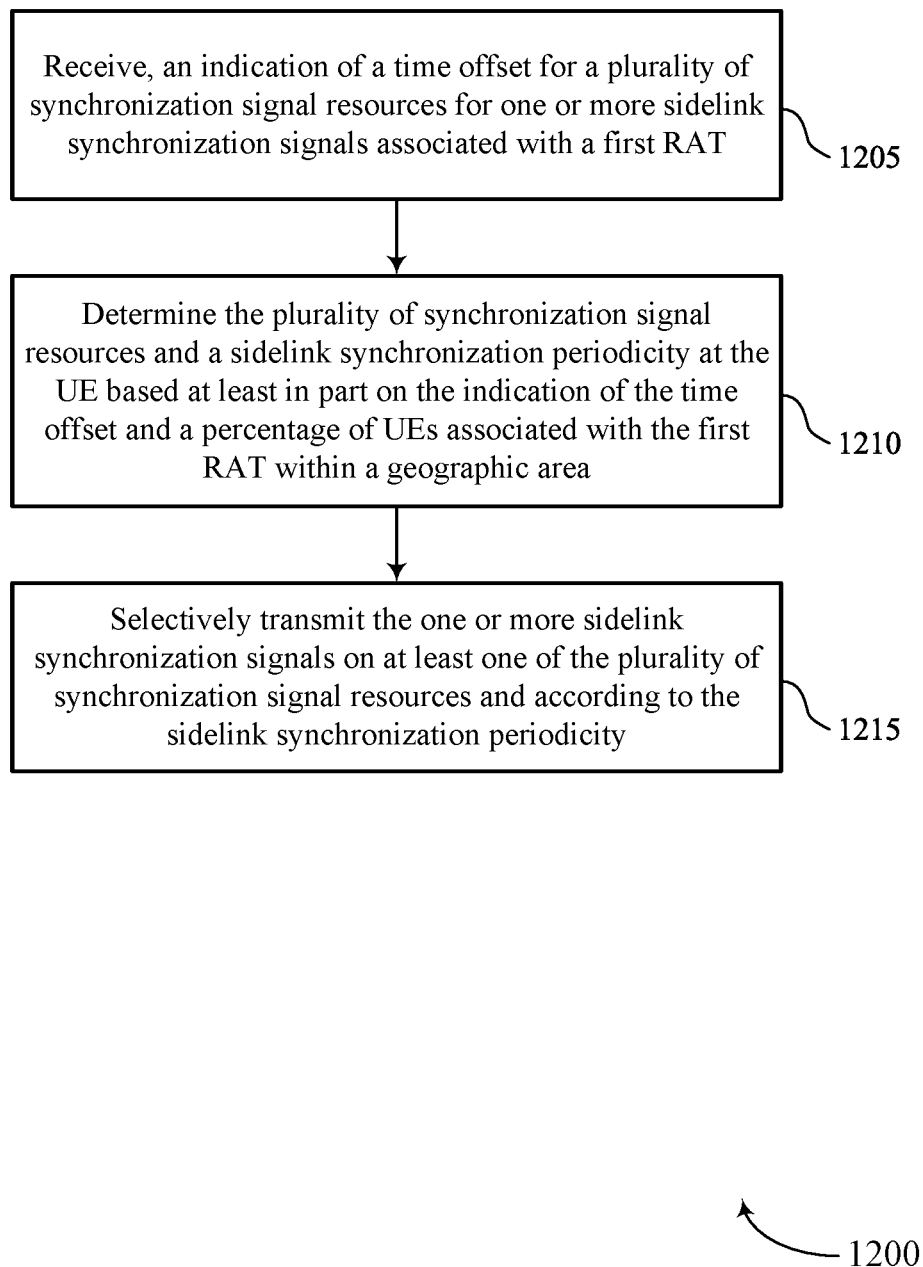
FIGS. 12 through 15 show flowcharts illustrating methods that support resource sharing between sidelink devices using different RATs in accordance with one or more aspects of the present disclosure.

FIG. 12 shows a flowchart illustrating a method 1200 that supports resource sharing between sidelink devices using different RATs in accordance with one or more aspects of the present disclosure. The operations of the method 1200 may be implemented by a UE or its components as described herein. For example, the operations of the method 1200 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1205, the method may include receiving, an indication of a time offset for a set of multiple synchronization signal resources for one or more sidelink synchronization signals associated with a first RAT. The operations of 1205 may be performed in accordance with examples as disclosed herein. In some examples, aspects of the operations of 1205 may be performed by a time offset component 1025 as described with reference to FIG. 10.

At 1210, the method may include determining the set of multiple synchronization signal resources and a sidelink synchronization periodicity at the UE based on the indication of the time offset and a percentage of UEs associated with the first RAT within a geographic area. The operations of 1210 may be performed in accordance with examples as disclosed herein. In some examples, aspects of the operations of 1210 may be performed by a resource determination component 1030 as described with reference to FIG. 10.

At 1215, the method may include selectively transmitting the one or more sidelink synchronization signals on at least one of the set of multiple synchronization signal resources and according to the sidelink synchronization periodicity. The operations of 1215 may be performed in accordance with examples as disclosed herein. In some examples, aspects of the operations of 1215 may be performed by a synchronization signal component 1035 as described with reference to FIG. 10.

Figure 13:
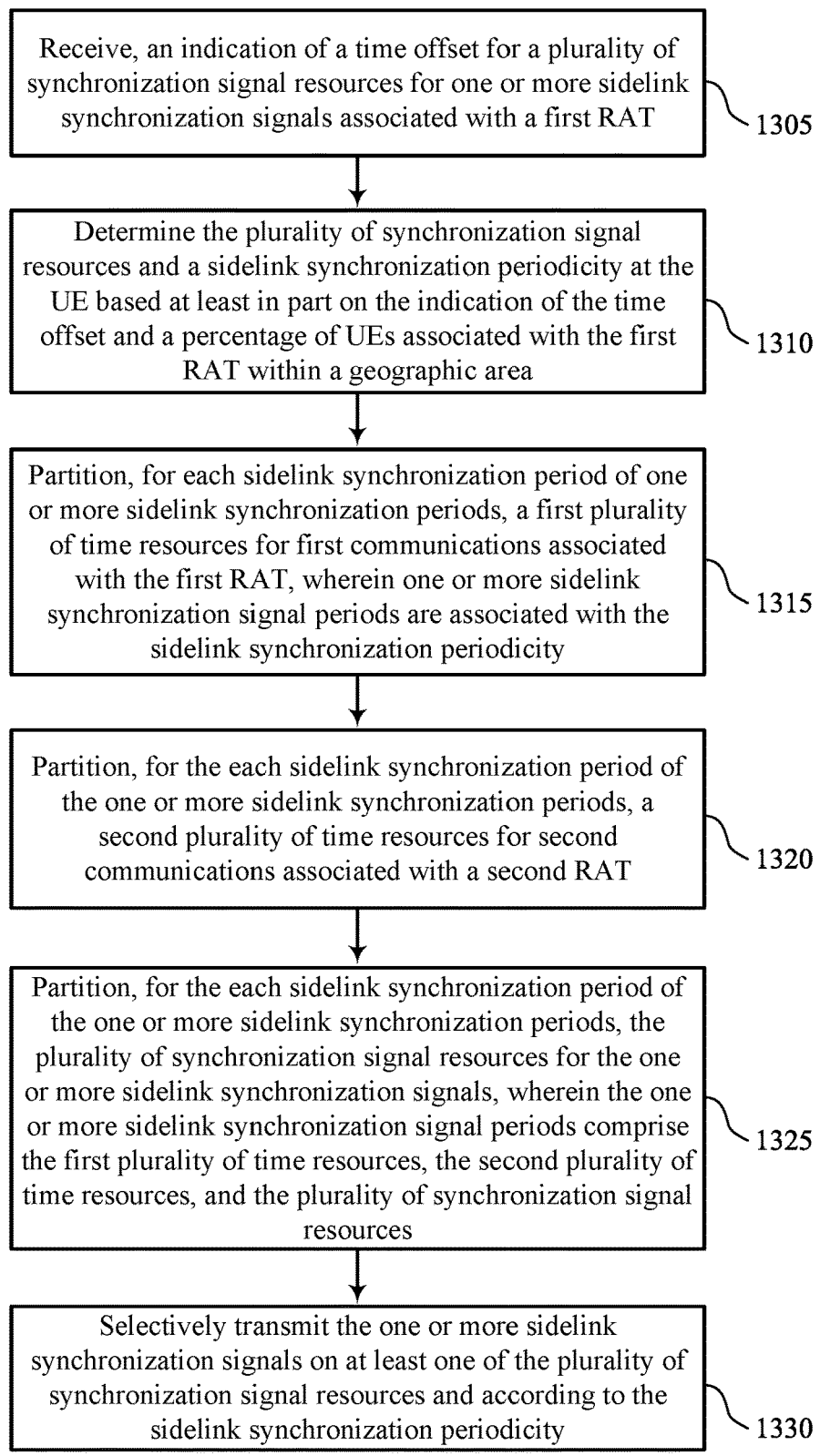

FIG. 13 shows a flowchart illustrating a method 1300 that supports resource sharing between sidelink devices using different RATs in accordance with one or more aspects of the present disclosure. The operations of the method 1300 may be implemented by a UE or its components as described herein. For example, the operations of the method 1300 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1305, the method may include receiving, an indication of a time offset for a set of multiple synchronization signal resources for one or more sidelink synchronization signals associated with a first RAT. The operations of 1305 may be performed in accordance with examples as disclosed herein. In some examples, aspects of the operations of 1305 may be performed by a time offset component 1025 as described with reference to FIG. 10.

At 1310, the method may include determining the set of multiple synchronization signal resources and a sidelink synchronization periodicity at the UE based on the indication of the time offset and a percentage of UEs associated with the first RAT within a geographic area. The operations of 1310 may be performed in accordance with examples as disclosed herein. In some examples, aspects of the operations of 1310 may be performed by a resource determination component 1030 as described with reference to FIG. 10.

At 1315, the method may include partitioning, for each sidelink synchronization period of one or more sidelink synchronization periods, a first set of multiple time resources for first communications associated with the first RAT, where one or more sidelink synchronization signal periods are associated with the sidelink synchronization periodicity. The operations of 1315 may be performed in accordance with examples as disclosed herein. In some examples, aspects of the operations of 1315 may be performed by a resource determination component 1030 as described with reference to FIG. 10.

At 1320, the method may include partitioning, for the each sidelink synchronization period of the one or more sidelink synchronization periods, a second set of multiple time resources for second communications associated with a second RAT. The operations of 1320 may be performed in accordance with examples as disclosed herein. In some examples, aspects of the operations of 1320 may be performed by a resource determination component 1030 as described with reference to FIG. 10.

At 1325, the method may include partitioning, for the each sidelink synchronization period of the one or more sidelink synchronization periods, the set of multiple synchronization signal resources for the one or more sidelink synchronization signals, where the one or more sidelink synchronization signal periods include the first set of multiple time resources, the second set of multiple time resources, and the set of multiple synchronization signal resources. The operations of 1325 may be performed in accordance with examples as disclosed herein. In some examples, aspects of the operations of 1325 may be performed by a resource determination component 1030 as described with reference to FIG. 10.

At 1330, the method may include selectively transmitting the one or more sidelink synchronization signals on at least one of the set of multiple synchronization signal resources and according to the sidelink synchronization periodicity. The operations of 1330 may be performed in accordance with examples as disclosed herein. In some examples, aspects of the operations of 1330 may be performed by a synchronization signal component 1035 as described with reference to FIG. 10.

Figure 14:
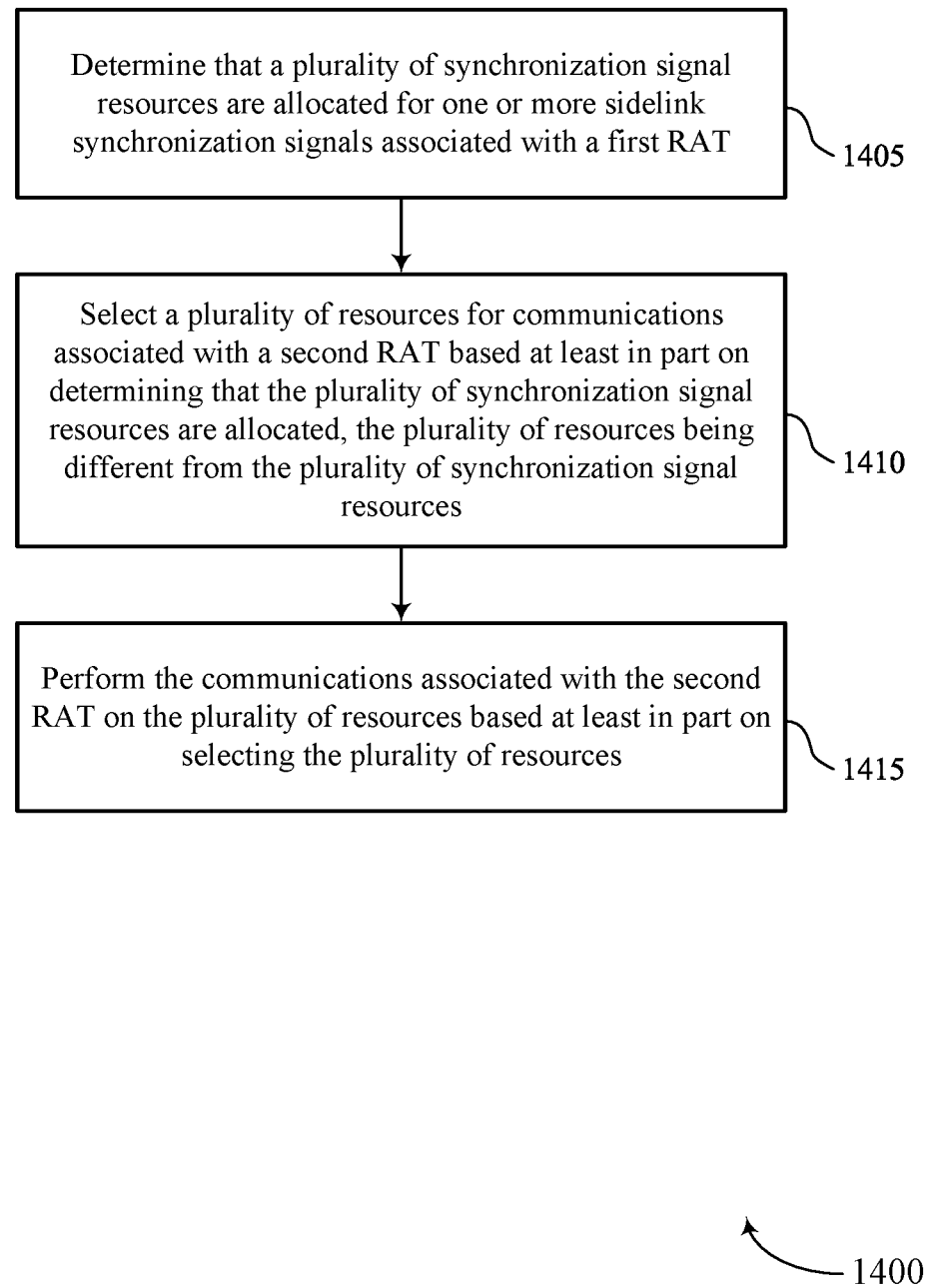

FIG. 14 shows a flowchart illustrating a method 1400 that supports resource sharing between sidelink devices using different RATs in accordance with one or more aspects of the present disclosure. The operations of the method 1400 may be implemented by a UE or its components as described herein. For example, the operations of the method 1400 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1405, the method may include determining that a set of multiple synchronization signal resources are allocated for one or more sidelink synchronization signals associated with a first RAT. The operations of 1405 may be performed in accordance with examples as disclosed herein. In some examples, aspects of the operations of 1405 may be performed by a resource determination component 1030 as described with reference to FIG. 10.

At 1410, the method may include selecting a set of multiple resources for communications associated with a second RAT based on determining that the set of multiple synchronization signal resources are allocated, the set of multiple resources being different from the set of multiple synchronization signal resources. The operations of 1410 may be performed in accordance with examples as disclosed herein. In some examples, aspects of the operations of 1410 may be performed by a resource configuration component 1040 as described with reference to FIG. 10.

At 1415, the method may include performing the communications associated with the second RAT on the set of multiple resources based on selecting the set of multiple resources. The operations of 1415 may be performed in accordance with examples as disclosed herein. In some examples, aspects of the operations of 1415 may be performed by a communication component 1045 as described with reference to FIG. 10.

Figure 15:
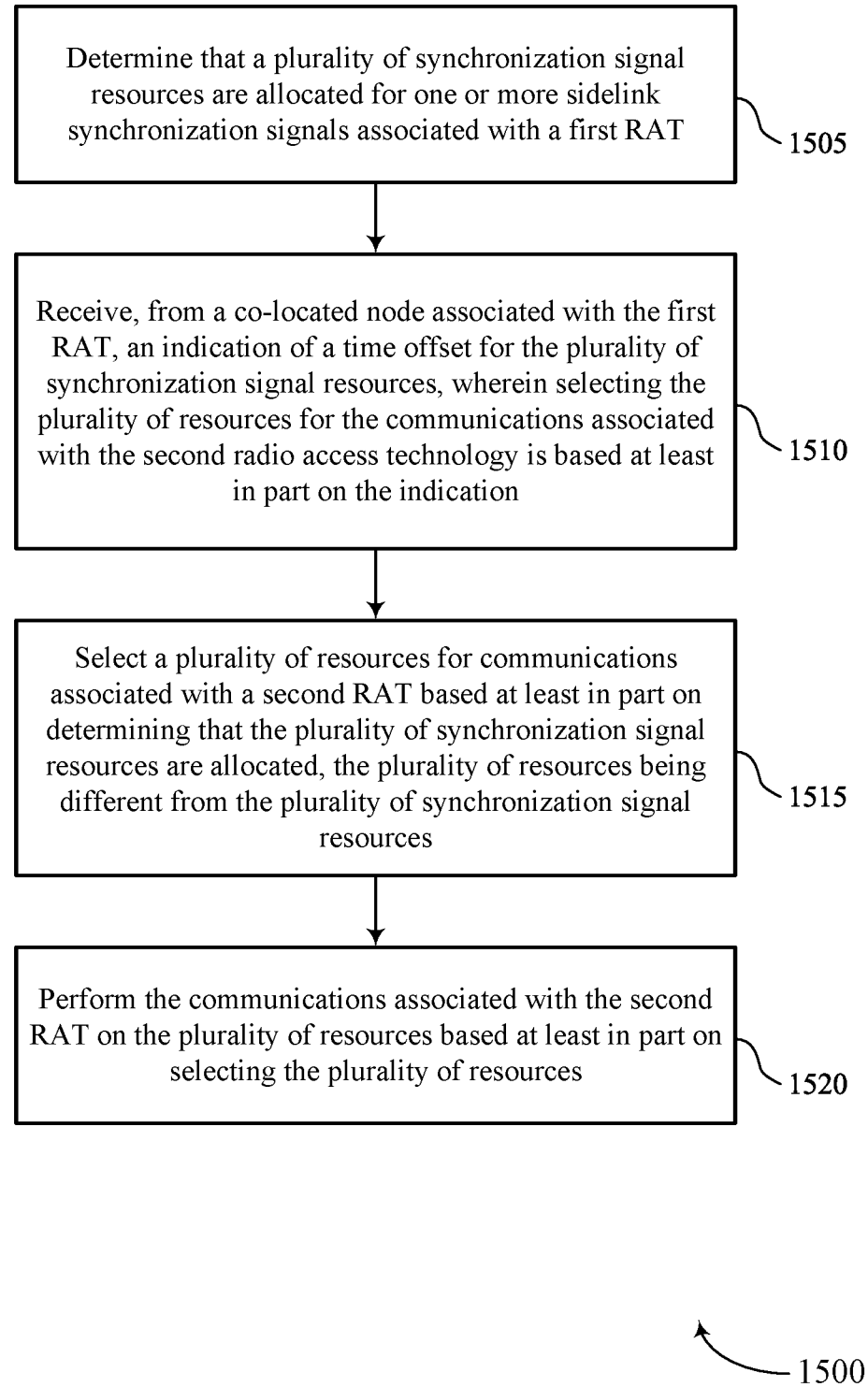

FIG. 15 shows a flowchart illustrating a method 1500 that supports resource sharing between sidelink devices using different RATs in accordance with one or more aspects of the present disclosure. The operations of the method 1500 may be implemented by a UE or its components as described herein. For example, the operations of the method 1500 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1505, the method may include determining that a set of multiple synchronization signal resources are allocated for one or more sidelink synchronization signals associated with a first RAT. The operations of 1505 may be performed in accordance with examples as disclosed herein. In some examples, aspects of the operations of 1505 may be performed by a resource determination component 1030 as described with reference to FIG. 10.

At 1510, the method may include receiving, from a co-located node associated with the first RAT, an indication of a time offset for the set of multiple synchronization signal resources, where selecting the set of multiple resources for the communications associated with the second RAT is based on the indication. The operations of 1510 may be performed in accordance with examples as disclosed herein. In some examples, aspects of the operations of 1510 may be performed by a time offset component 1025 as described with reference to FIG. 10.

At 1515, the method may include selecting a set of multiple resources for communications associated with a second RAT based on determining that the set of multiple synchronization signal resources are allocated, the set of multiple resources being different from the set of multiple synchronization signal resources. The operations of 1515 may be performed in accordance with examples as disclosed herein. In some examples, aspects of the operations of 1515 may be performed by a resource configuration component 1040 as described with reference to FIG. 10.

At 1520, the method may include performing the communications associated with the second RAT on the set of multiple resources based on selecting the set of multiple resources. The operations of 1520 may be performed in accordance with examples as disclosed herein. In some examples, aspects of the operations of 1520 may be performed by a communication component 1045 as described with reference to FIG. 10.

The following provides an overview of aspects of the present disclosure:

Aspect 1: A method for wireless communications at a UE, comprising: receiving, an indication of a time offset for a plurality of synchronization signal resources for one or more sidelink synchronization signals associated with a first RAT; determining the plurality of synchronization signal resources and a sidelink synchronization periodicity at the UE based at least in part on the indication of the time offset and a percentage of UEs associated with the first RAT within a geographic area; and selectively transmitting the one or more sidelink synchronization signals on at least one of the plurality of synchronization signal resources and according to the sidelink synchronization periodicity.

Aspect 2: The method of aspect 1, wherein determining the plurality of synchronization signal resources further comprises: partitioning, for each sidelink synchronization period of one or more sidelink synchronization periods, a first plurality of time resources for first communications associated with the first RAT, wherein one or more sidelink synchronization signal periods are associated with the sidelink synchronization periodicity; partitioning, for the each sidelink synchronization period of the one or more sidelink synchronization periods, a second plurality of time resources for second communications associated with a second RAT; and partitioning, for the each sidelink synchronization period of the one or more sidelink synchronization periods, the plurality of synchronization signal resources for the one or more sidelink synchronization signals, wherein the one or more sidelink synchronization signal periods comprise the first plurality of time resources, the second plurality of time resources, and the plurality of synchronization signal resources.

Aspect 3: The method of aspect 2, further comprising: determining a quantity of the one or more sidelink synchronization periods according to an integer multiple, wherein the first plurality of time resources, the second plurality of time resources, and the plurality of synchronization signal resources are based at least in part on the quantity of the one or more sidelink synchronization periods.

Aspect 4: The method of any of aspects 1 through 3, wherein selectively transmitting the one or more sidelink synchronization signals comprises: partitioning the plurality of synchronization signal resources for the one or more sidelink synchronization signals in accordance with the determining; and transmitting the one or more sidelink synchronization signals based at least in part on the partitioning.

Aspect 5: The method of any of aspects 1 through 4, further comprising: partitioning the plurality of synchronization signal resources for one or more second sidelink synchronization signals associated with a second RAT in accordance with the determining.

Aspect 6: The method of aspect 5, wherein selectively transmitting the one or more sidelink synchronization signals further comprises: refraining from transmitting the one or more sidelink synchronization signals based at least in part on a priority of the one or more second sidelink synchronization signals being greater than a priority of the one or more sidelink synchronization signals.

Aspect 7: The method of any of aspects 5 through 6, wherein selectively transmitting the one or more sidelink synchronization signals further comprises: transmitting the one or more sidelink synchronization signals on the at least one of the plurality of synchronization signal resources.

Aspect 8: The method of aspect 7, further comprising: repartitioning the plurality of synchronization signal resources based at least in part on shifting a first portion of the plurality of synchronization signal resources by a time interval, wherein the at least one of the plurality of synchronization signal resources comprise the first portion of the plurality of synchronization signal resources.

Aspect 9: The method of aspect 8, further comprising: transmitting an indication of the time interval, one or more time resources for which the UE performs the repartitioning, or both in system information.

Aspect 10: The method of any of aspects 1 through 9, wherein determining the sidelink synchronization periodicity comprises: receiving one or more indications of one or more additional sidelink synchronization periodicities; and updating the sidelink synchronization periodicity based at least in part on the one or more additional sidelink synchronization periodicities being greater than the sidelink synchronization periodicity, a reference signal receive power associated with the indication being greater than a threshold reference signal receive power, or both.

Aspect 11: The method of any of aspects 1 through 10, further comprising: broadcasting an indication of the sidelink synchronization periodicity based at least in part on determining the sidelink synchronization periodicity at the UE.

Aspect 12: The method of any of aspects 1 through 11, further comprising: transmitting, at a first time interval, one or more scheduling assignments for scheduling a plurality of communication resources for a second RAT, the one or more scheduling assignments reserving the at least one of the plurality of synchronization signal resources for the one or more sidelink synchronization signals.

Aspect 13: The method of aspect 12, wherein selectively transmitting the one or more sidelink synchronization signals further comprises: transmitting, at a second time interval after the first time interval and in accordance with the sidelink synchronization periodicity, the one or more sidelink synchronization signals based at least in part on transmitting the one or more scheduling assignments.

Aspect 14: The method of aspect 13, wherein the first RAT comprises fifth generation new radio and the second RAT comprises long term evolution.

Aspect 15: The method of any of aspects 12 and 14, wherein selectively transmitting the one or more sidelink synchronization signals further comprises: transmitting, at the first time interval, the one or more sidelink synchronization signals based at least in part on transmitting the one or more scheduling assignments.

Aspect 16: The method of any of aspects 1 through 15, further comprising: monitoring for one or more second sidelink synchronization signals; determining, based at least in part on the monitoring, that a quantity of the one or more second sidelink synchronization signals received at the UE is below a threshold; and configuring the plurality of synchronization signal resources for sidelink shared channel signaling, sidelink feedback channel signaling, or both based at least in part on determining that a quantity of received sidelink synchronization signals are below a threshold quantity.

Aspect 17: The method of any of aspects 1 through 16, further comprising: configuring the plurality of synchronization signal resources for sidelink shared channel signaling, sidelink feedback channel signaling, or both based at least in part on the sidelink synchronization periodicity being less than a periodicity for transmitting the one or more sidelink synchronization signals.

Aspect 18: The method of any of aspects 1 through 17, further comprising: dynamically configuring the plurality of synchronization signal resources and the sidelink synchronization periodicity according to a dynamic resource pool partition frame structure.

Aspect 19: The method of any of aspects 1 through 18, wherein selectively transmitting the one or more sidelink synchronization signals is in accordance with the percentage of UEs associated with the first RAT.

Aspect 20: The method of any of aspects 1 through 19, wherein the percentage of UEs associated with the first RAT within the geographic area further comprises a ratio of a first quantity of UEs associated with the first RAT within the geographic area to a sum of the first quantity of UEs and a second quantity of UEs associated with a second RAT within the geographic area.

Aspect 21: A method for wireless communications at a first UE, comprising: determining that a plurality of synchronization signal resources are allocated for one or more sidelink synchronization signals associated with a first RAT; selecting a plurality of resources for communications associated with a second RAT based at least in part on determining that the plurality of synchronization signal resources are allocated, the plurality of resources being different from the plurality of synchronization signal resources; and performing the communications associated with the second RAT on the plurality of resources based at least in part on selecting the plurality of resources.

Aspect 22: The method of aspect 21, further comprising: receiving, from a co-located node associated with the first RAT, an indication of a time offset for the plurality of synchronization signal resources, wherein selecting the plurality of resources for the communications associated with the second RAT is based at least in part on the indication.

Aspect 23: The method of any of aspects 21 through 22, further comprising: receiving control information indicating a time offset for the plurality of synchronization signal resources, wherein selecting the plurality of resources for the communications associated with the second RAT is based at least in part on the time offset.

Aspect 24: The method of any of aspects 21 through 23, further comprising: receiving, from a second UE, the one or more sidelink synchronization signals associated with the first RAT; and determining a time offset for the plurality of synchronization signal resources, wherein selecting the plurality of resources for the communications associated with the second RAT is based at least in part on determining the time offset.

Aspect 25: The method of any of aspects 21 through 24, wherein selecting the plurality of resources for the communications associated with the second RAT further comprises: allocating a resource of the plurality of resources for communications associated with the second RAT as a synchronization signal resource for the one or more sidelink synchronization signals associated with the first RAT.

Aspect 26: The method of aspect 25, wherein selecting the plurality of resources for the communications associated with the second RAT comprises: determining a percentage of UEs within a geographic area associated with the second RAT; and allocating the plurality of resources for the communications associated with the second RAT based at least in part on the percentage.

Aspect 27: The method of any of aspects 21 through 26, wherein selecting the plurality of resources for the communications associated with the second RAT further comprises: shifting the plurality of resources for communications associated with the second RAT by a quantity of time intervals.

Aspect 28: The method of any of aspects 21 through 27, further comprising: transmitting an indication of the selected plurality of resources for the communications associated with the second RAT based at least in part on a reference signal received power of the one or more sidelink synchronization signals being below a threshold.

Aspect 29: An apparatus for wireless communications at a UE, comprising a processor; memory coupled with the processor; and instructions stored in the memory and executable by the processor to cause the apparatus to perform a method of any of aspects 1 through 20.

Aspect 30: An apparatus for wireless communications at a UE, comprising at least one means for performing a method of any of aspects 1 through 20.

Aspect 31: A non-transitory computer-readable medium storing code for wireless communications at a UE, the code comprising instructions executable by a processor to perform a method of any of aspects 1 through 20.

Aspect 32: An apparatus for wireless communications at a first UE, comprising a processor; memory coupled with the processor; and instructions stored in the memory and executable by the processor to cause the apparatus to perform a method of any of aspects 21 through 28.

Aspect 33: An apparatus for wireless communications at a first UE, comprising at least one means for performing a method of any of aspects 21 through 28.

Aspect 34: A non-transitory computer-readable medium storing code for wireless communications at a first UE, the code comprising instructions executable by a processor to perform a method of any of aspects 21 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   a processor;
   memory coupled with the processor; and
   instructions stored in the memory and executable by the processor to cause the apparatus to:
      receive, an indication of a time offset for a plurality of synchronization signal resources for one or more sidelink synchronization signals associated with a first radio access technology;
      determine the plurality of synchronization signal resources and a sidelink synchronization periodicity at the UE based at least in part on the indication of the time offset and a percentage of UEs associated with the first radio access technology within a geographic area; and
      selectively transmit the one or more sidelink synchronization signals on at least one of the plurality of synchronization signal resources and according to the sidelink synchronization periodicity.

2. The apparatus of claim 1, wherein the instructions to determine the plurality of synchronization signal resources are further executable by the processor to cause the apparatus to:
   partition, for each sidelink synchronization period of one or more sidelink synchronization periods, a first plurality of time resources for first communications associated with the first radio access technology, wherein one or more sidelink synchronization signal periods are associated with the sidelink synchronization periodicity;
   partition, for the each sidelink synchronization period of the one or more sidelink synchronization periods, a second plurality of time resources for second communications associated with a second radio access technology; and
   partition, for the each sidelink synchronization period of the one or more sidelink synchronization periods, the plurality of synchronization signal resources for the one or more sidelink synchronization signals, wherein the one or more sidelink synchronization signal periods comprise the first plurality of time resources, the second plurality of time resources, and the plurality of synchronization signal resources.

3. The apparatus of claim 2, wherein the instructions are further executable by the processor to cause the apparatus to:
   determine a quantity of the one or more sidelink synchronization periods according to an integer multiple, wherein the first plurality of time resources, the second plurality of time resources, and the plurality of synchronization signal resources are based at least in part on the quantity of the one or more sidelink synchronization periods.

4. The apparatus of claim 1, wherein the instructions to selectively transmit the one or more sidelink synchronization signals are executable by the processor to cause the apparatus to:
   partition the plurality of synchronization signal resources for the one or more sidelink synchronization signals in accordance with the determining; and
   transmit the one or more sidelink synchronization signals based at least in part on the partitioning.

5. The apparatus of claim 1, wherein the instructions are further executable by the processor to cause the apparatus to:
   partition the plurality of synchronization signal resources for one or more second sidelink synchronization signals associated with a second radio access technology in accordance with the determining.

6. The apparatus of claim 5, wherein the instructions to selectively transmit the one or more sidelink synchronization signals are further executable by the processor to cause the apparatus to:
   refrain from transmitting the one or more sidelink synchronization signals based at least in part on a priority of the one or more second sidelink synchronization signals being greater than a priority of the one or more sidelink synchronization signals.

7. The apparatus of claim 5, wherein the instructions to selectively transmit the one or more sidelink synchronization signals are further executable by the processor to cause the apparatus to:
   transmit the one or more sidelink synchronization signals on the at least one of the plurality of synchronization signal resources.

8. The apparatus of claim 7, wherein the instructions are further executable by the processor to cause the apparatus to:
   repartition the plurality of synchronization signal resources based at least in part on shifting a first portion of the plurality of synchronization signal resources by a time interval, wherein the at least one of the plurality of synchronization signal resources comprise the first portion of the plurality of synchronization signal resources.

9. The apparatus of claim 8, wherein the instructions are further executable by the processor to cause the apparatus to:

transmit an indication of the time interval, one or more time resources for which the UE performs the repartitioning, or both in system information.

10. The apparatus of claim 1, wherein the instructions to determine the sidelink synchronization periodicity are executable by the processor to cause the apparatus to:
receive one or more indications of one or more additional sidelink synchronization periodicities; and
update the sidelink synchronization periodicity based at least in part on the one or more additional sidelink synchronization periodicities being greater than the sidelink synchronization periodicity, a reference signal receive power associated with the indication being greater than a threshold reference signal receive power, or both.

11. The apparatus of claim 1, wherein the instructions are further executable by the processor to cause the apparatus to:
broadcast an indication of the sidelink synchronization periodicity based at least in part on determining the sidelink synchronization periodicity at the UE.

12. The apparatus of claim 1, wherein the instructions are further executable by the processor to cause the apparatus to:
transmit, at a first time interval, one or more scheduling assignments for scheduling a plurality of communication resources for a second radio access technology, the one or more scheduling assignments reserving the at least one of the plurality of synchronization signal resources for the one or more sidelink synchronization signals.

13. The apparatus of claim 12, wherein the instructions to selectively transmit the one or more sidelink synchronization signals are further executable by the processor to cause the apparatus to:
transmit, at a second time interval after the first time interval and in accordance with the sidelink synchronization periodicity, the one or more sidelink synchronization signals based at least in part on transmitting the one or more scheduling assignments.

14. The apparatus of claim 13, wherein the first radio access technology comprises fifth generation new radio and the second radio access technology comprises long term evolution.

15. The apparatus of claim 12, wherein the instructions to selectively transmit the one or more sidelink synchronization signals are further executable by the processor to cause the apparatus to:
transmit, at the first time interval, the one or more sidelink synchronization signals based at least in part on transmitting the one or more scheduling assignments.

16. The apparatus of claim 1, wherein the instructions are further executable by the processor to cause the apparatus to:
monitor for one or more second sidelink synchronization signals;
determine, based at least in part on the monitoring, that a quantity of the one or more second sidelink synchronization signals received at the UE is below a threshold; and
configure the plurality of synchronization signal resources for sidelink shared channel signaling, sidelink feedback channel signaling, or both based at least in part on determining that a quantity of received sidelink synchronization signals are below a threshold quantity.

17. The apparatus of claim 1, wherein the instructions are further executable by the processor to cause the apparatus to:
configure the plurality of synchronization signal resources for sidelink shared channel signaling, sidelink feedback channel signaling, or both based at least in part on the sidelink synchronization periodicity being less than a periodicity for transmitting the one or more sidelink synchronization signals.

18. The apparatus of claim 1, wherein the instructions are further executable by the processor to cause the apparatus to:
dynamically configure the plurality of synchronization signal resources and the sidelink synchronization periodicity according to a dynamic resource pool partition frame structure.

19. The apparatus of claim 1, wherein the instructions are further executable by the processor to cause the apparatus to:
selectively transmit the one or more sidelink synchronization signals in accordance with the percentage of UEs associated with the first radio access technology.

20. The apparatus of claim 1, wherein the percentage of UEs associated with the first radio access technology within the geographic area further comprises a ratio of a first quantity of UEs associated with the first radio access technology within the geographic area to a sum of the first quantity of UEs and a second quantity of UEs associated with a second radio access technology within the geographic area.

21. An apparatus for wireless communications at a first user equipment (UE), comprising:
a processor;
memory coupled with the processor; and
instructions stored in the memory and executable by the processor to cause the apparatus to:
determine that a plurality of synchronization signal resources are allocated for one or more sidelink synchronization signals associated with a first radio access technology;
select a plurality of resources for communications associated with a second radio access technology based at least in part on determining that the plurality of synchronization signal resources are allocated, the plurality of resources being different from the plurality of synchronization signal resources; and
perform the communications associated with the second radio access technology on the plurality of resources based at least in part on selecting the plurality of resources,
wherein the instructions to select the plurality of resources for the communications associated with the second radio access technology are executable by the processor to cause the apparatus to:
determine a percentage of UEs within a geographic area associated with the second radio access technology; and
allocate the plurality of resources for the communications associated with the second radio access technology based at least in part on the percentage.

22. The apparatus of claim 21, wherein the instructions are further executable by the processor to cause the apparatus to:
receive, from a co-located node associated with the first radio access technology, an indication of a time offset for the plurality of synchronization signal resources, wherein selecting the plurality of resources for the communications associated with the second radio access technology is based at least in part on the indication.

23. The apparatus of claim 21, wherein the instructions are further executable by the processor to cause the apparatus to:
receive control information indicating a time offset for the plurality of synchronization signal resources, wherein selecting the plurality of resources for the communications associated with the second radio access technology is based at least in part on the time offset.

24. The apparatus of claim 21, wherein the instructions are further executable by the processor to cause the apparatus to:
receive, from a second UE, the one or more sidelink synchronization signals associated with the first radio access technology; and
determine a time offset for the plurality of synchronization signal resources, wherein selecting the plurality of resources for the communications associated with the second radio access technology is based at least in part on determining the time offset.

25. The apparatus of claim 21, wherein the instructions to select the plurality of resources for the communications associated with the second radio access technology are further executable by the processor to cause the apparatus to:
allocate a resource of the plurality of resources for communications associated with the second radio access technology as a synchronization signal resource for the one or more sidelink synchronization signals associated with the first radio access technology.

26. The apparatus of claim 21, wherein the instructions to select the plurality of resources for the communications associated with the second radio access technology are further executable by the processor to cause the apparatus to:
shift the plurality of resources for communications associated with the second radio access technology by a quantity of time intervals.

27. The apparatus of claim 21, wherein the instructions are further executable by the processor to cause the apparatus to:
transmit an indication of the selected plurality of resources for the communications associated with the second radio access technology based at least in part on a reference signal received power of the one or more sidelink synchronization signals being below a threshold.

28. A method for wireless communications at a user equipment (UE), comprising:
receiving, an indication of a time offset for a plurality of synchronization signal resources for one or more sidelink synchronization signals associated with a first radio access technology;
determining the plurality of synchronization signal resources and a sidelink synchronization periodicity at the UE based at least in part on the indication of the time offset and a percentage of UEs associated with the first radio access technology within a geographic area; and
selectively transmitting the one or more sidelink synchronization signals on at least one of the plurality of synchronization signal resources and according to the sidelink synchronization periodicity.

29. A method for wireless communications at a first user equipment (UE), comprising:
determining that a plurality of synchronization signal resources are allocated for one or more sidelink synchronization signals associated with a first radio access technology;
selecting a plurality of resources for communications associated with a second radio access technology based at least in part on determining that the plurality of synchronization signal resources are allocated, the plurality of resources being different from the plurality of synchronization signal resources; and
performing the communications associated with the second radio access technology on the plurality of resources based at least in part on selecting the plurality of resources,
wherein selecting the plurality of resources for the communications associated with the second radio access technology comprises:
determining a percentage of UEs within a geographic area associated with the second radio access technology; and
allocating the plurality of resources for the communications associated with the second radio access technology based at least in part on the percentage.

* * * * *